United States Patent [19]
Chen et al.

[11] Patent Number: 6,037,052
[45] Date of Patent: Mar. 14, 2000

[54] MAGNETIC THIN FILM FERRITE HAVING A FERRITE UNDERLAYER

[75] Inventors: Yingjian Chen; Mark H. Kryder, both of Pittsburgh, Pa.

[73] Assignee: Carnegie Mellon University, Pittsburgh, Pa.

[21] Appl. No.: 08/890,191

[22] Filed: Jul. 9, 1997

Related U.S. Application Data

[63] Continuation-in-part of application No. 08/704,315, Sep. 6, 1996.
[60] Provisional application No. 60/030,236, Nov. 8, 1996.

[51] Int. Cl.⁷ ....................................................... G11B 5/66
[52] U.S. Cl. ...................... 428/332; 428/336; 428/694 T; 428/694 TR; 428/694 TM; 428/694 TS; 428/900; 428/218; 427/128; 427/129; 427/130; 204/192.2
[58] Field of Search ......................... 428/694 T, 694 TR, 428/694 TM, 694 TS, 900, 336, 332, 218; 427/130, 128, 129; 204/192.2

[56] References Cited

U.S. PATENT DOCUMENTS 5,492,775  2/1996  Ahlert ................................. 428/694 T

OTHER PUBLICATIONS

T.L. Mylton et al, "Ba–ferrite thin films . . . ", J. Appl. Phys. 75(10), pp. 5960–5965, May 15, 1994.
P.C. Dorsey, et al, "Oriented barium hexaferrite films . . . " J. Mag. Magn. Mater. 137, pp. 89–97, 1994.
J. Li, et al, "As–deposited crystalline barium ferrite . . . " J. Mag. Magn. Mater. 153, pp. 246–254, 1996.
Y. Chen et al., "Influence of Ba content on grain size . . . " J. Appl. Phys. 81 (8) pp. 4380–4382, Apr. 15, 1997.

Yingjian Chen, et al., "Influence of Ba content on grain size and dynamics of crystallization in barium ferrite thin films", J. Appl. Phys. 81 (8), Apr. 15, 1997, pp. 4380–4382.
Copies of slide series entitled "Barium Ferrite Thin Film Recording Media: Influence Of Ba Content On Grain Size And Crystallization Dynamics", Data Storage Systems Center, Department of Electrical and Computer Engineering, Carnegie Mellon University.
T.L. Hylton, et al., "Ba–ferrite thin–film media for high–density longitudinal recording (invited)", J. Appl. Phys. 75(10), pp. 5960–5965 (May 15, 1994).
P.C. Dorsey and C. Vittoria, "Oriented barium hexaferrite films grown on amorphous substrates," J. Mag. Magn. Mater. 137, pp. 89–97 (1994).
J. Li, et al., "As–deposited crystalline barium ferrite thin film media for longitudinal recording", J. Mag. Magn. Mater. 153, pp. 246–254 (1996).
J. Li, et al., "High density recording characteristics of sputtered barium ferrite thin films", IEEE Trans. Magn., vol. 31, No. 6, pp. 2749–2751 (Nov. 1995).
X. Sui and M. Kryder, "Magnetic easy axis randomly in–plane oriented barium hexaferrite thin film media," Appl. Phys. Lett. 63 (11), pp. 1582–1584 (Sep. 13, 1993).

(List continued on next page.)

*Primary Examiner*—Leszek Kiliman
*Attorney, Agent, or Firm*—Kirkpatrick & Lockhart LLP

[57] ABSTRACT

A magnetic thin film includes a ferrite-containing underlayer and a ferrite-containing top layer. The composition of the underlayer differs from that of the top layer. During ex-situ annealing of the thin film structure, the underlayer inhibits diffusion of substrate atoms into the top layer. The composition of the underlayer relative to the top layer suppresses grain nucleation within the underlayer relative to the top layer at high temperatures and inhibits the nucleation of grains within the underlayer having undesirable composition, crystal structure, and orientation.

40 Claims, 15 Drawing Sheets

OTHER PUBLICATIONS

A. Morisako, et al., "Influences of sputtering gas pressure on microtexture and crystallographic characteristics of Ba–ferrite thin films for high density recording media", IEEE Trans. Magn., vol. Mag–23, No. 1, pp. 56–58 (Jan. 1987).

A. Morisako, "The effect of underlayer for Ba–ferrite sputtered films on c–axis orientation", J. Appl. Phys. 81(8), pp. 4374–4376 (Apr. 15, 1997).

Xiaoyo Sui, et al., Growth of perpendicular barium hexaferrite thin film media on a Pt underlayer for high density perpendicular magnetic recording, J. Mag. Soc. Japan, vol. 18, Supplement S1 (1994).

Kyusik Sin, et al., "Preparation and characterization of thin films of M–type barium ferrite on microcrystalline carbon substrates with diffusion barrier underlayers," J. Appl. Phys. 73 (10), pp. 6689–6691 (May 15, 1993).

P. Gerard, et al., "Crystallization phenomena in thin films of amorphous barium hexaferrite", Solid State Commun., vol. 71, No. 1, pp. 57–62 (1989).

E. Lacroix and P. Gerard, "Substrate effects on the crystalline orientation of barium hexaferrite films," J. App. Phys., vol. 69, No. 8, pp. 4770–4772 (Apr. 15, 1991).

MAGNETIC THIN FILM FERRITE HAVING A FERRITE UNDERLAYER

CROSS-REFERENCE TO RELATED APPLICATIONS

This application is provisional of Ser. No. 60/030,236 filed Nov. 8, 1996 and a continuation-in-part of application Ser. No. 08/704,315 filed Sep. 6, 1996 now pending.

STATEMENT REGARDING FEDERALLY SPONSORED RESEARCH OR DEVELOPMENT

This work was supported in part by a National Science Foundation grant, Grant No. ECD 8907068. The United States government has certain rights in this material.

TECHNICAL FIELD AND INDUSTRIAL APPLICABILITY OF THE INVENTION

The present invention is directed generally to magnetic thin films and devices incorporating the thin films. More particularly, the present invention is directed to ferrite thin films and devices incorporating those films.

BACKGROUND OF THE INVENTION

Magnetic thin films generally include a substrate material and at least one layer of magnetic material supported by the substrate material. Magnetic thin films are used in a variety of applications, including information storage and microwave and millimeter wave devices. For example, disks, disk drives, and tape incorporating magnetic thin film media are efficient information storage means.

In all applications the need for magnetic thin films having improved magnetic properties has accelerated. For example, in the field of information storage there is an accelerating demand for magnetic recording media having improved data storage capacity, lower noise, and reduced cost. Science and industry have endeavored to address this demand by developing magnetic recording media having better-defined grain structures, increased recording densities, and lower associated noise. However, the relatively recent explosion in the use of personal computers in the office and at home has kindled a demand for magnetic recording media with even greater data storage capacity, lower noise, and reduced cost.

In the information storage field, data is commonly stored on magnetic thin film media in the form of magnetic disks. Most magnetic disks may be broadly classified as either flexible ("floppy") or rigid ("hard"). Binary information is stored on the disks in magnetic bits within segmented circular tracks partitioned on the magnetic surface of the disk. A typical disk drive includes one or more of magnetic disks rotated on a central axis. To either supplement or retrieve information stored on a disk, a magnetic head, or slider, is disposed on a movable arm positioned over and very close to the surface of the disk. The head passes over the disk's segmented tracks and accesses or adds to the information stored on the disk as the disk rotates.

A typical magnetic disk includes one or more thin film layers disposed on a substrate material such as, for example, aluminum or glass. In their basic form, magnetic disks include a magnetic layer and, typically, an overcoat to protect the magnetic layer. The overcoat also may be coated with an organic lubricant. An overcoat is always used on cobalt-based thin films because such films easily oxidize when exposed to air and are not particularly wear resistant. The magnetic layer is the primary element of the magnetic disk on which information is stored; by inducing magnetic fields within particular regions of the magnetic layer on the disk, bits of information are recorded. Because information is stored on the disks in this way, the magnetic film's magnetic properties, such as coercivity ($H_c$), remnant magnetization ($M_r$), coercivity squareness ($S^*$), and switching field distribution, directly influence the media's recording performance. These and other magnetic properties of magnetic disks, tape, and other thin film magnetic recording media depend in large part on the microstructure of the magnetic film layer.

One family of magnetic thin films are the ferrite thin films. The magnetic ferrite thin films include a crystalline magnetic layer composed of one or more ferrite compounds such as, for example, strontium ferrite, barium ferrite, zinc ferrite, manganese ferrite, ferrous ferrite, cobalt ferrite, nickel ferrite, magnesium ferrite, cadmium ferrite, copper ferrite, lithium ferrite, and lead ferrite, as well as mixed ferrites made of combinations of these and other ferrites, including garnets. Certain of the ferrite thin films have applications as the magnetic layer in thin film magnetic recording media. However, ferrite thin films may be used in a variety of other technologies, including microwave and millimeter wave devices.

Thin films fabricated from the ferrite compound barium ferrite and/or strontium ferrite (also known as barium and/or strontium hexaferrite) are known for use as thin film magnetic recording media. In their crystalline form, barium ferrite and strontium ferrite have the compositions $BaFe_{12}O_{19}$ ($BaO \cdot Fe_2O_3$) and $SrFe_{12}O_{19}$ ($SrO \cdot 6Fe_2O_3$), respectively. The magnetic properties of barium ferrite and strontium ferrite differ significantly from those of the cobalt-based alloys commonly used as the magnetic layer in thin film magnetic recording media. In their crystalline state, barium ferrite and strontium ferrite have lower saturation magnetization ($M_s$), but a much higher anisotropy field ($H_k$) than typical cobalt-based alloys. Considered from the viewpoint of optimizing the media's magnetic properties and ignoring any limitations of magnetic head technology, although reduced $M_s$ is not optimal because it suggests a corresponding decrease in recording signal output, high linear densities, which require narrow transition width, may be achieved with barium ferrite and/or strontium ferrite. Transition width is believed to be proportional to the square root of $M_r t/H_c$ if $S^*$ is $\cong 1$ and the film thickness t is much smaller that the head-to-media spacing. Barium ferrite and strontium ferrite are, therefore, favorable in terms of transition width because of their relatively low $M_s$ and high $H_c$. Magnetic layers of barium ferrite and strontium ferrite also exhibit excellent chemical stability against environmental corrosion, and the layers' high mechanical hardness may make an overcoat layer unnecessary.

For ferrite thin film longitudinal magnetic recording media, including barium ferrite and strontium ferrite media, the desired crystalline structure, or texture is that wherein the c-axes, which are also the magnetic easy axes of the grains, are oriented in the film plane. In practice, current technology limits optimal grain texture to that in which the c-axes of the grains are randomly oriented. Theoretically, higher values of $H_c$ and $S^*$ ($\cong 1$) narrow the transition width and thereby improve recording performance. Practically however, the $M_s$ of the writing head is a limiting factor for the suitable upper limit of $H_c$ of the media. The current limitations of magnetic head technology may make it necessary to reduce the $H_c$ of the media to a range that will allow current-generation write heads to write to the media (currently less than about 3000 Oe). Known techniques for reducing barium ferrite media $H_c$ include, for example, doping the media's magnetic film with appropriate amounts of dopants such as, for example, cobalt, titanium, and zinc in order to reduce the anisotropy of the film.

It is generally desirable to achieve small grain sizes in ferrite thin films in order to provide media useful for ultra-high density magnetic recording applications. In order to achieve a 10 Gbit/in$^2$ recording density, it is generally considered that a grain size of the order of 100 Å is necessary. However, the minimum grain size suitable for recording purposes will be limited by the thermal stability of the magnetic properties of the individual grains.

Ferrite thin films can be fabricated by sputter depositing ferrite materials onto various types of substrates. The films are amorphous and nonmagnetic as sputter deposited at room temperature, and must be converted to a magnetic form for use as magnetic recording media, in microwave and millimeter wave devices, and in various other technologies. The amorphous films may be caused to undergo an amorphous-to-crystalline phase transformation to a magnetic film by subjecting them to either an in-situ or ex-situ annealing. See A. Morisako et al., "Influences of Sputtering Gas Pressure on Microstructure and Crystallographic Characteristic of Ba-Ferrite Thin Films for High Density Recording Media", IEEE Trans. Magn. 23, 56 (January 1987); P. Gerard et al., "Crystallization in Thin Films of Amorphous Barium Hexaferrite", Solid State Comm. 71, 57 (1989); X. Sui and M. Kryder, "Magnetic Easy Axis Randomly In-Plane Oriented Barium Hexaferrite Thin Film Media", Appl. Phys. Lett. 63, 1582 (September 1993). In the in-situ annealing process, the films are annealed during deposition, and the crystalline form of ferrite forms as the film is laid down. An ex-situ, or "post-deposition", annealing process is one applied to films already deposited in their amorphous and nonmagnetic form, and the films only become crystalline and magnetic when annealed under appropriate conditions.

The annealing temperatures necessary to produce crystalline ferrite thin films are very high, typically around 600° C. for in-situ annealing and around 800° C. for ex-situ annealing. At these high temperatures the atoms in the substrate materials may diffuse a significant distance into an overlying ferrite thin film. For example, T. Hylton et al., "Ba-Ferrite Thin-Film Media for High-Density Longitudinal Recording", J. Appl. Phys. 75, 5960 (May 15, 1994), reports the presence of a 260 Å non-magnetic interdiffused layer at the interface of a 500 Å $Cr_2O_3$-doped barium ferrite thin film on an oxidized silicon substrate. It is believed that within or even near the diffused layer in the thin film, traditionally referred to as the "dead layer", grains of undesirable crystallographic orientations, of chemical compositions other than the ferrite material, or of non-uniform sizes may be formed as a result of the presence of the diffused substrate atoms. In a sense, the dead layer is not truly dead, but may contain some amount of magnetically active grains. Because of the deviations in crystal orientation, chemical composition, and grain size in the dead layer, that layer's magnetic properties may be deteriorated.

In the case of ferrite thin film magnetic recording media, the deterioration of the dead layer's magnetic properties and its constituent grains' non-uniform composition, orientation, and size may significantly degrade the magnetic recording properties of the thin films. For example, grains of perpendicular orientation may reduce the in-plane $M_r$ and $H_c$ of the film. Grains of larger sizes typically exhibit lower $H_c$ due to incoherent rotation of magnetization. Grains consisting of atoms other than those of the film's constituent ferrite material may also have different anisotropy and, consequently, different $H_c$. Films incorporating two or more phases (including differing compositions, orientations, or grain sizes) generally would be expected to have lower S* values than a film of a single phase.

The presence of a dead layer may likewise adversely affect magnetic ferrite thin films used in other applications. For example, the presence of a dead layer in a ferrite thin film used in microwave applications could adversely affect the homogeneity of the film, causing dispersion in the magnetic resonance performance of the devices.

Many types of high temperature-durable substrates have been tested and found unsuitable for the direct application of ferrite thin films because of the problems resulting from diffusion. In particular, a body of work devoted to identifying useful barium ferrite thin film recording media has identified a number of substrates that will diffuse into an overlying barium ferrite thin film layer at high temperature. See E. Lacroix et al., "Substrate Effects on the Crystalline Orientation of Barium Hexaferrite Films", J. Appl. Phys. 69,4770 (Apr. 15, 1991). Various underlayers (also referred to as boundary layers), disposed between the substrate and a ferrite thin film layer, have been attempted to prevent diffusion from the substrate. One commonly investigated underlayer type is the oxides. For example, P. Dorsey et al., "Oriented Barium Hexaferrite Films Grown on Amorphous Substrates", J. Magn. Magn. Mater. 137, 89 (1994), discloses a zinc oxide underlayer deposited on a fused quartz substrate using a pulsed laser deposition technique at 600° C. A barium ferrite layer was deposited on the zinc oxide underlayer at 750–800° C. and exhibited a c-axis orientation. A considerable amount of zinc diffused from the underlayer into the magnetic layer, and the composition of the thin film at the surface was barium ferrite ($BaFe_{12}O_{19}$) with approximately 3% zinc substituted for iron.

A sputtered silicon dioxide boundary layer deposited on a carbon substrate is taught in K. Sin et al., J. Appl. Phys. 73, 6689 (1993).

Other variations of underlayers intended to prevent the adverse effects of substrate atom diffusion include silicon nitride coated onto a carbon substrate. A randomly oriented crystalline barium ferrite thin film was then deposited in-situ onto the silicon nitride layer by facing target sputtering at a substrate temperature of 650° C. without post-deposition annealing. J. Li et al., "High Density Recording Characteristics of Sputtered Barium Ferrite Thin Films", IEEE Trans. Magn. 31, 2749 (November 1995).

All of these known underlayers are not entirely satisfactory because they may introduce into an overlying ferrite thin film a diffused layer containing magnetic grains nearly as undesirable as the grains produced by the diffusion of substrate atoms directly into the ferrite thin film layer.

Noble metals have also been investigated as underlayer boundaries to diffusion in ferrite thin films. For example, X. Sui, "Growth of Perpendicular Barium Hexaferrite Thin Film Media on a Pt Underlayer for High Density Perpendicular Magnetic Recording", J. Magn. Soc. Jpn. 18, S1, 19 (1994), discloses the use of a sputtered 2500 Å thick platinum underlayer between a thermally oxidized silicon substrate and a sputtered 600 Å thick barium ferrite layer. The deposited layers were annealed ex-situ at 800° C. in air to bring about the amorphous-to-crystalline transition in the barium ferrite layer.

Accordingly, in order to address the demand for better magnetic ferrite thin films, the need remains for a ferrite thin film construction that will inhibit the detrimental affects to the magnetic ferrite thin film layer resulting from the diffusion of substrate atoms at high temperatures. In particular, to address the demand for improved magnetic information storage devices, a need exists for ferrite thin film recording media of a construction that will inhibit the detrimental magnetic affects of substrate atom diffusion during annealing.

SUMMARY OF THE INVENTION

The present invention addresses the need for improved thin film ferrites by providing thin film ferrites comprising a substrate on which is deposited a first layer of ferrite material having a first composition. A second layer of ferrite material is deposited on at least a portion of the first layer, the first layer acting as an underlayer for the second layer. (The substrate incorporating at least the first and second layers thereon is at times referred to herein as a "layered substrate".) The second layer may be transformed from its as-deposited non-magnetic, predominantly amorphous form to a predominantly crystalline form by subjecting the layered substrate to at least one heating step. Conversion to a predominantly crystalline form transforms the second layer to a magnetic layer.

The ferrite materials of the underlayer and second layer may be selected from any of the ferrite materials known as being useful for thin film applications including, for example, strontium ferrite, barium ferrite, zinc ferrite, manganese ferrite, ferrous ferrite, cobalt ferrite, nickel ferrite, magnesium ferrite, cadmium ferrite, copper ferrite, lithium ferrite, and lead ferrite, as well as mixed ferrites made of combinations of these and other ferrites, including garnets.

The composition of the ferrite underlayer of the present invention's thin films is different than the composition of the second layer. The compositional difference between the underlayer and top layer is selected so that the underlayer has a suppressed grain nucleation rate at high temperatures relative to the grain nucleation rate of the top layer. Nucleation suppression within the underlayer relative to the top layer provides the beneficial effect of inhibiting the formation of grains having undesirable composition, crystal structure, and orientation within the region of the underlayer into which substrate atoms diffuse at high temperature. Thus, the relatively reduced grain nucleation rate within the underlayer inhibits the nucleation of grains within that layer during ex-situ annealing and other high temperature processing of the ferrite thin films of the invention. The presence of the underlayer in the invention's ferrite thin films also may accommodate interdiffusion of substrate atoms and reduces the possibility that substrate atoms will diffuse into the top layer during annealing and form a dead layer that degrades the magnetic properties of the top layer.

In one embodiment of the invention, the compositional difference in the underlayer that suppresses grain nucleation relative to the top layer is a reduced content, relative to the top layer, of one of the constituent elements of which the layers' ferrite materials is composed. The ferrite material in both the underlayer and top layer of the invention's thin films principally includes atoms of oxygen, iron, and at least one additional element that will be identified as "M" for purposes of this description. For example, in strontium ferrite, barium ferrite, and zinc ferrite, element M is strontium, barium, and zinc, respectively. Mixed ferrites will necessarily include at least one other element in addition to oxygen, iron, and M. Also, each layer of the thin film ferrite of the invention may include additional atoms of other elements in the forms of incidental impurity elements and elements intentionally added to alter the structure and/or properties of the films. Examples of intentionally added elements include, for example, dopants to modify thin film grain size, coercivity, and anisotropy. The content of element M within the ferrite underlayer is less than that of the second ferrite layer. The reduction in the amount of element M within the underlayer suppresses the rate of grain nucleation in the underlayer at high temperature annealing conditions relative to the nucleation rate achieved in the top layer. The presence of the underlayer also accommodates diffusion of substrate atoms and thereby inhibits the diffusion of such atoms into the top layer.

A more specific embodiment of the present invention addresses the need for improved thin film magnetic recording media by providing thin film media comprising a substrate on which is deposited a first layer of barium ferrite having a first barium content. A second layer of barium ferrite is deposited on at least a portion of the first layer, the first layer acting as an underlayer for the second layer. As with the other ferrite materials comprising ferrite thin films, the second barium ferrite layer may be transformed from its as-deposited non-magnetic, predominantly amorphous form to a crystalline magnetic form by heating the layered substrate. The barium content of the barium ferrite underlayer is less than that of the second layer. The relative barium-poor character of the underlayer suppresses the rate of grain nucleation in the underlayer at high temperature annealing conditions, relative to the nucleation rate achieved in the top layer. The low barium content barium ferrite underlayer provides the benefits of nucleation suppression and also reduces the possibility of substrate atom diffusion into the top layer and the consequent formation of a dead layer that may degrade the magnetic recording properties of the top layer.

With respect to the barium ferrite thin films of the invention, the inventors have ascertained the barium contents of the various barium ferrite layers investigated in terms of barium oxide contents and, specifically, in barium oxide weight percentages. For purposes of this specification's description of the underlayer and top layer of barium ferrite thin films of the invention, terms such as "barium-poor", "low barium content", "barium-rich", "high barium content", and like terms are used in the relative sense and compare the barium oxide contents of the barium ferrite underlayer and barium ferrite top layer for a particular ferrite thin film embodiment of the present invention. Unless otherwise stated, these terms should be interpreted as being relative terms and should not be considered to signify any absolute barium oxide content. Also, references herein to barium ferrite, strontium ferrite, and the various other ferrite materials are to such materials, whether amorphous or crystalline, having compositions that are the same as the materials' stoichiometric compositions or that differ from the stoichiometric compositions by variation in the content of element M. For purposes of this description, references to "less than" or "greater than" stoichiometric, or like references, refer to deviations in the content of element M relative to that typically found in the stoichiometric composition of the particular referenced ferrite material. In the case of barium ferrite, wherein the barium content has been ascertained by determining barium oxide content, the reference herein to barium ferrite encompasses crystalline or amorphous barium ferrite compositions having a barium oxide content that equals, is greater than, or is less than the typical barium oxide content (approximately 13.4 weight percent) of stoichiometric barium ferrite ($BaFe_{12}O_{19}$).

The inventors have discovered that the barium ferrite thin films of the invention are particularly useful as longitudinal magnetic recording media because under appropriate conditions the high barium content barium ferrite layer may be caused to have a generally random c-axis orientation on ex-situ annealing. These barium ferrite thin film media of the invention may be fabricated so as to have a coercivity selected from a wide coercivity range by, for example, doping, and high coercivity squareness. Measurement has shown that magnetic barium ferrite thin films constructed according to the invention provide sharp transitions and narrow switching field distributions.

The difference in composition between the underlayer and top layer of the ferrite thin films of the invention is selected so that the resulting difference in crystallization rates between the two layers is such that significantly fewer crystal grains nucleate in the underlayer than in the top layer during annealing and other high temperature processing.

In the barium ferrite thin films of the invention, in order to provide a suitable relative difference in suppression of nucleation between the underlayer and top layer and a commercially practical window of annealing conditions, a difference in barium oxide contents between the two layers of more than 5 weight percent is preferred. It is believed that increasing the barium oxide content of as-deposited barium ferrite films will enhance the film's grain nucleation rate. Thus, to enhance nucleation and thereby reduce grain size within the top layer when annealing the invention's barium ferrite thin films under typical barium ferrite thin film ex-situ annealing conditions, it is preferred that the top layer have a barium oxide content in excess of the approximately 13.4 weight percent barium oxide content of stoichiometric barium ferrite ($BaFe_{12}O_{19}$).

Similarly, the ferrite top layer of ferrite thin films of the invention fabricated from other than barium ferrite preferably should have a composition that enhances the layer's nucleation rate over that of a film of the same ferrite material having a stoichiometric composition. The top layer of the ferrite thin films of the invention may, however, have any composition, whether equal to, greater than, or less than stoichiometric, as long as it may be crystallized on annealing and as long as the compositional difference between the top layer and underlayer provides a suitable nucleation rate suppression in the underlayer relative to the top layer at the particular annealing conditions to be used. In the case of the invention's barium ferrite thin films, for example, the difference in contents between the barium ferrite top layer and barium ferrite underlayer must provide a suitable nucleation rate suppression in the underlayer.

The underlayer of the present invention's thin films should have a thickness that will prevent diffusion of substrate atoms through the underlayer and into the top layer during annealing. The underlayer thickness necessary to prevent diffusion into the top layer will primarily depend upon the diffusivities of the particular substrate's atoms within the particular ferrite underlayer used and the parameters of the annealing procedure to be employed. Ferrite thin films of the invention fabricated with substrates whose atoms readily diffuse into a ferrite layer, for example, carbon-containing substrates, will require an underlayer having a minimum thickness that is greater than that for thin films including substrates of atoms with relatively lesser diffusivity in the underlayer. Given a particular ferrite thin film of the invention having a particular substrate and underlayer composition, greater minimum underlayer thicknesses will be necessary when annealing at higher temperatures or for longer time-at-temperature, because the extent of substrate atom diffusion will typically increase as either of these annealing parameters increases. Also, in order to optimize the magnetic properties of the ferrite thin films of the invention, it is preferred to include an additional 300–400 Å of underlayer thickness beyond such minimum thicknesses. It is believed that the additional 300–400 Å underlayer thickness may accommodate the growth of grains nucleated within the top layer.

Because thicker underlayers of a given composition will increase crystallization within that layer, the underlayers of ferrite thin films of the invention should be thin enough to ensure suppression of nucleation relative to the films' top layers.

With an understanding of the foregoing concepts, one of ordinary skill in the magnetic thin film art may readily ascertain the necessary minimum underlayer thickness for a thin film of the present invention incorporating a particular substrate and that will be annealed at specific conditions. For example, with respect to the present invention's barium ferrite thin films, the inventors have determined that an underlayer thickness of about 600–800 Å should be used with a thin film of the invention comprising an oxidized silicon substrate, a 12 weight percent barium oxide barium ferrite underlayer, a 23 weight percent barium oxide barium ferrite top layer, and a 790° C. rapid thermal anneal for 60 seconds.

The suitable minimum thickness of the ferrite top layer of the ferrite thin films of the present invention will depend in large part on the average grain size desired in that layer on annealing. In general, for a thin film layer of a particular composition, the number of available nucleation centers will increase or decrease with corresponding changes in the thickness of the top layer. It is also believed that as the content of element M of a given volume of a particular ferrite within the top layer increases, the number of available nucleation sites also increases. For example, it has been shown that an increase in the barium oxide content of a layer of barium ferrite of a given thickness increases the nucleation rate of that layer. An increased number of nucleation sites will reduce the average grain size on annealing at specified conditions. Thus, the minimum suitable top layer thickness will generally increase as the desired grain size decreases. The minimum suitable top layer thickness may also increase as the content of element M (measured in, for example, weight percent) decreases. With respect to barium ferrite thin films, an increase in barium oxide content in the top layer will reduce the minimum suitable top layer thickness.

The suitable outer limit of top layer thickness will primarily depend on the $M_r t$ value desired for the thin film media. Also, as the top layer thickness increases, a point will be reached at which the underlayer provides no discernible enhancement of the top layer's magnetic properties and the additional fabrication required for underlayer deposition may not be justified.

One of ordinary skill in the thin film magnetic media art considering the foregoing competing concerns may determine the suitable top layer thickness range for a ferrite thin film of the invention having a particular composition and desiring a particular average grain size and $M_r t$ value.

As discussed below, with respect to the barium ferrite thin films that are part of the invention, the inventors have determined that a high barium content top layer thickness in the range of 100–1000 Å is preferable for a thin film recording medium of the invention having a 23 weight percent barium oxide content top layer and an average grain size and $M_r t$ value within a range suitable for current barium ferrite thin film longitudinal recording media applications.

The substrate material of the ferrite thin films of the present invention may be selected from any of the known thin film substrate materials that will resist the high temperatures experienced on annealing. These substrates include, for example, oxidized silicon, glass, $Al_2O_3$, silicon carbide, and ceramic substrates. Other substrate materials will be readily apparent to those having ordinary skill in the magnetic thin film art.

When used as magnetic recording media in information storage applications, the magnetic ferrite thin films of the invention may be provided in the form of a magnetic disk such as, for example, a rigid ("hard") disk. The thin films may be incorporated as part of an information storage device such as, for example, a magnetic disk drive, in which information is stored on the thin film magnetic media of the invention in the form of magnetic bits that may be subsequently accessed.

In a basic form, the invention is directed to ferrite underlayers for ferrite thin films comprising a substrate and a second layer of a ferrite material. The underlayer is interposed between the substrate and the second ferrite layer and has a composition that differs from the second ferrite layer. The compositional difference between the two ferrite layers is selected so that nucleation within the underlayer is suppressed relative to the second ferrite layer during the process of annealing the thin film to crystallize the second ferrite layer. In the particular case of the barium ferrite thin films that are part of the invention, the underlayer is composed of a barium ferrite material having a barium oxide content that is less than that of the second barium ferrite layer so as to suppress nucleation in the underlayer at high temperatures.

The present invention is also directed to a process for fabricating magnetic ferrite thin films wherein at least a portion of a substrate is provided with a first layer of a ferrite material having a first composition. A second ferrite layer, having a second composition, is then deposited in a later step of the process so that the first layer is interposed as an underlayer between the substrate and the second layer. Both layers are deposited in a predominantly amorphous state. The two compositions differ such that the nucleation rate of the underlayer is less than that of the second layer at high temperatures. In a step subsequent to the deposition of the ferrite underlayer and second layer, the layered substrate is heated at a temperature and for a time necessary to transform the second layer to a predominantly crystalline state, while grain nucleation in the underlayer is inhibited.

With respect to the present invention's process for fabricating the barium ferrite thin films that are a part of the invention, the composition of the underlayer and second layer is selected so that the barium oxide content (per unit weight or volume) of the underlayer is less than that of the second barium ferrite layer.

The actual examples within the following detailed description of embodiments of the invention are directed to barium ferrite thin films for use as magnetic thin film recording media. However, it will be understood that the principles of the invention may be applied to thin film media having layers of any of the other ferrite materials useful in thin film applications. Thus, the invention is not limited to thin films, thin film media, underlayers, and fabrication processes comprising or utilizing barium ferrite. It will also be appreciated by those skilled in the art that, although thin film ferrites are of interest for magnetic recording media, they also have application in other technologies, such as microwave and millimeter wave devices. It will be understood that the present invention is applicable to all such ferrite thin films, regardless of their application or constituent ferrite material composition, and that such ferrite thin films may be made without deviating from the claims of this invention.

BRIEF DESCRIPTION OF THE DRAWINGS

The construction and advantages of the present invention will be better understood by reference to the accompanying drawings in which.

DETAILED DESCRIPTION OF EMBODIMENTS OF THE INVENTION

Figure 1:
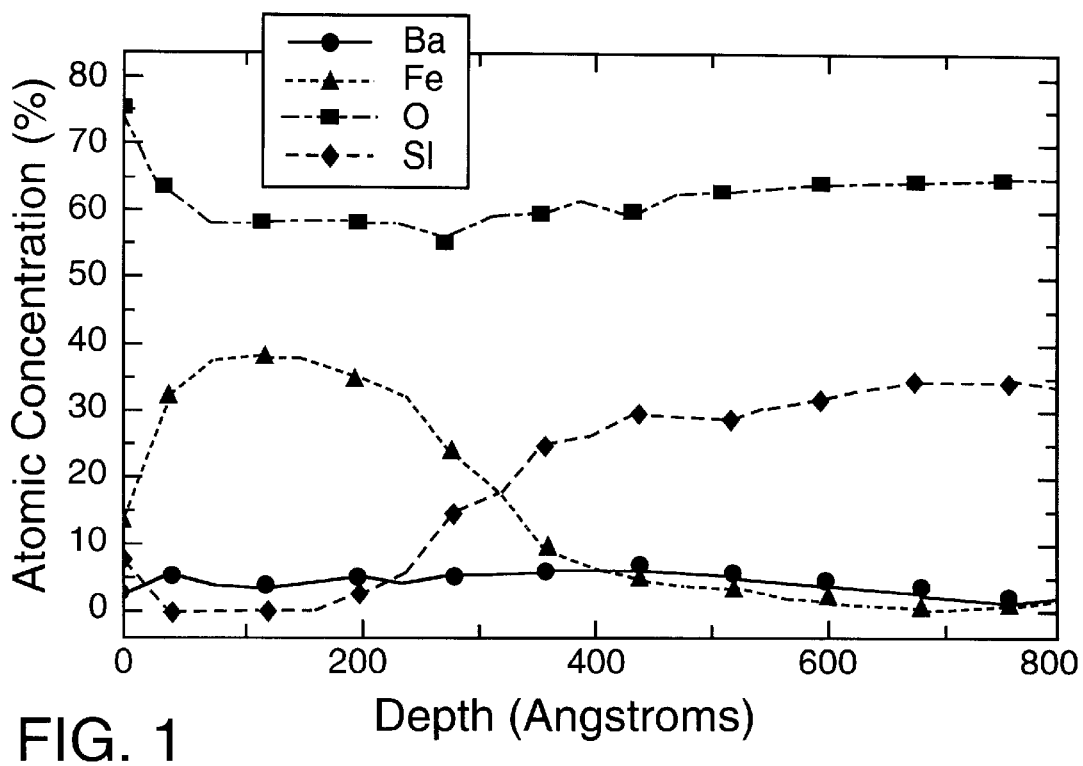
FIG. 1 is an X-ray photoelectron spectroscopy depth profile of a 500 Å barium ferrite thin film deposited on an oxidized silicon substrate.

The present invention is directed to improved ferrite thin films comprising a substrate material, an underlayer comprising a ferrite material, and a second ferrite material layer. The composition of the two ferrite layers differs in a way that suppresses nucleation of grains within the underlayer at high temperatures.

The ferrite materials of the underlayer and second layer may be selected from any of the magnetic ferrite materials known as being useful for thin film applications including, for example, strontium ferrite, barium ferrite, zinc ferrite, manganese ferrite, ferrous ferrite, cobalt ferrite, nickel ferrite, magnesium ferrite, cadmium ferrite, copper ferrite, lithium ferrite, and lead ferrite, as well as mixed ferrites made of combinations of these and other ferrites, including ferrimagnetic garnets.

In one embodiment of the invention, the compositional difference in the underlayer that suppresses grain nucleation relative to the top layer is a reduced content, relative to the top layer, of one of the constituent elements of which the layers' ferrite materials is composed. The ferrite material in both the underlayer and top layer of the invention's thin films principally includes atoms of oxygen, iron, and at least one additional element that will be identified as "M" for purposes of this description. For example, in strontium ferrite, barium ferrite, and zinc ferrite, element M is strontium, barium, and zinc, respectively. Mixed ferrites will necessarily include at least one other element in addition to oxygen, iron, and M. Also, each layer of the thin film ferrite of the invention may include additional atoms of other elements in the forms of incidental impurity elements and elements intentionally added to alter the structure and/or properties of the films. Examples of intentionally added elements include, for example, dopants to modify thin film grain size, coercivity, and anisotropy. The content of element M within the ferrite underlayer is chosen so that the difference in composition of the underlayer relative to the top layer suppresses the rate of grain nucleation in the underlayer at high temperature annealing conditions relative to the nucleation rate achieved in the top layer. The presence of the underlayer also accommodates diffusion of substrate atoms and thereby inhibits the diffusion of such atoms into the top layer.

In one embodiment of the thin films of the invention, for example, the thin films are in the form of barium ferrite thin films comprising a substrate material, a barium ferrite underlayer, and a second barium ferrite layer that is substantially crystalline after appropriate ex-situ annealing. The barium oxide content of the underlayer is less than that of the second barium ferrite layer. The invention also is directed to thin film magnetic recording media comprising the thin film of the invention and to information storage devices incorporating the improved thin film media of the invention.

In fabricating the ferrite thin films that are part of the invention, at least a portion of a substrate is provided with a first layer of a ferrite material having a first composition. A second ferrite layer, having a second composition, is then deposited in a later step of the process so that the first layer is interposed as an underlayer between the substrate and the second layer. Both layers are deposited in a predominantly amorphous state. The two compositions differ such that the nucleation rate of the underlayer is less than that of the second layer at high temperatures. In a step subsequent to the deposition of the ferrite underlayer and second layer, the layered substrate is heated at a temperature and for a time necessary to transform the second layer to a predominantly crystalline state, while grain nucleation in the underlayer is inhibited.

For example, with respect to the present invention's process for fabricating the barium ferrite thin films that are part of the invention, a barium ferrite underlayer is deposited on a substrate material that can withstand the high temperatures of the ex-situ annealing process. Examples of suitable substrates include oxidized silicon, ceramic materials, and other high temperature-resistant substrate materials. An upper barium ferrite layer having a greater barium oxide content relative to the underlayer is deposited subsequent to deposition of the underlayer. The layered substrate is then annealed ex-situ at conditions that will substantially transform the high barium content upper layer to its crystalline and magnetic state.

As one example of the invention, the inventors have discovered that the use in barium ferrite thin film longitudinal magnetic recording media of a barium ferrite underlayer having a lower barium oxide content relative to the subsequently-deposited upper barium ferrite layer inhibits grain nucleation in the underlayer under appropriate annealing conditions. The difference in barium oxide contents results in a corresponding difference in the nucleation rates of the two layers. Thus, annealing conditions may be chosen by which the upper barium oxide layer may be crystallized while relatively little nucleation occurs in the underlayer. The underlayer also serves the added purpose of inhibiting diffusion of substrate atoms into the upper barium oxide layer.

The inventors confirmed the phenomenon of the diffusion at high temperature of substrate atoms into an overlaying ferrite thin film layer by conducting an X-ray photoelectron spectroscopy study of a 500 Å thick 23 weight percent barium oxide barium ferrite film deposited on an oxidized silicon substrate and annealed ex-situ in a rapid thermal annealing (RTA) furnace at 790° C. for 60 seconds. The RTA process is well known in the art. Because the RTA process principally employs radiation to heat an object, the furnace temperature setting will closely approximate the actual temperature of the object heated for thin objects such as thin film media.

FIG. 1 is a depth profile showing the atomic concentration of barium, iron, oxygen, and silicon measured at various depths from the film surface to about 300 Å into the substrate. An interdiffused region in the barium ferrite layer as thick as 300 Å containing barium, iron, oxygen, and silicon is observed after annealing. This value of dead layer thickness is in agreement with T. Hylton et al., J. Appl. Phys. 75, 5960 (1994).

Figure 2:
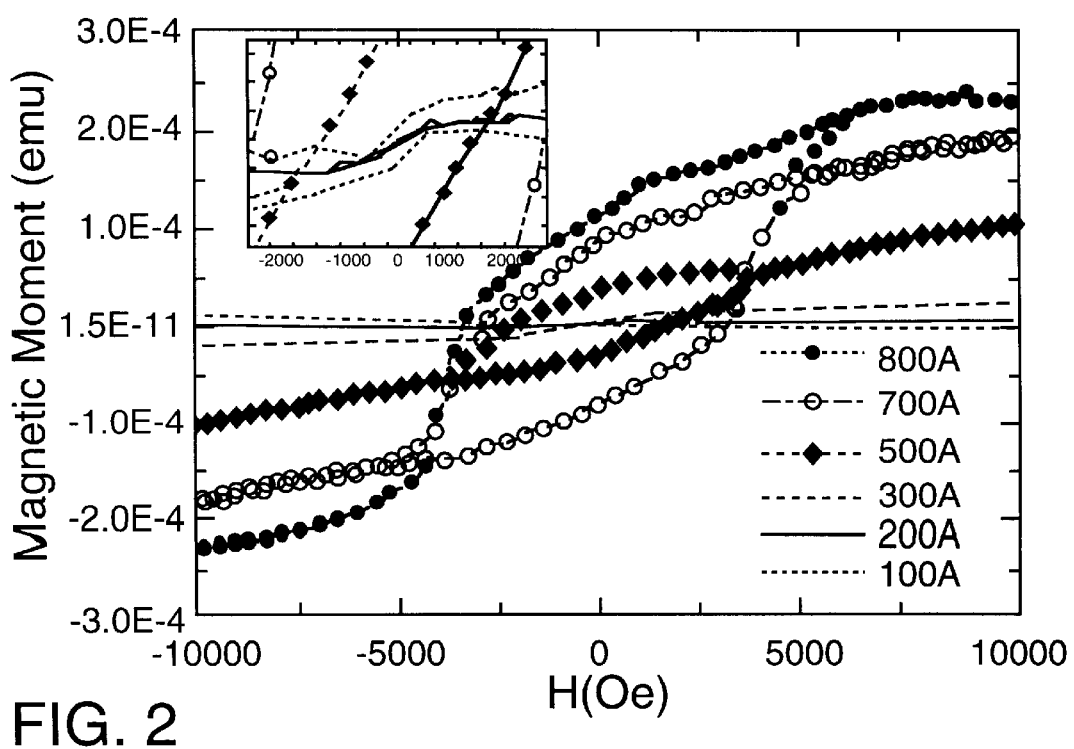
FIG. 2 is a plot of hysteresis loops of an initially 800 Å, approximately stoichiometric, barium ferrite film at certain steps of sputter etching so that portions of the film were removed and different film thicknesses remained.

The deterioration of the magnetic properties in the dead layer was found to be non-uniform and to depend principally on proximity to the interface between the substrate and the barium ferrite layer. FIG. 2 provides hysteresis loops measured after increasing amounts of an initially 800 Å thick barium ferrite film deposited on an oxidized silicon substrate were removed by sputter etching so that different film thicknesses remained. The hysteresis loops of the remaining barium ferrite films contained within the dead layer were observed to become less ferrimagnetic as more of the film was etched away. It is believed that the dead layer caused such effects and, in particular, significantly reduced the coercivity squareness (S*) of the remaining thin films. The reduction observed in S* was even greater for thinner films with thicknesses comparable to that of the dead layer.

The low barium content barium ferrite underlayer of the barium ferrite thin films that are a part of the invention has been found to still allow a diffused layer to form at its interface with the substrate, but it is believed that the lower barium content in the underlayer inhibits the nucleation of grains in the dead layer. Thus, although when using, for example, an oxidized silicon substrate some diffusion of silicon occurs into the underlayer, the inhibition of grain nucleation within the underlayer greatly reduces the formation of grains of undesirable composition, size, and crystallographic orientation.

Process steps used to produce the magnetic barium ferrite thin films that are a part of the invention are as follows. A first barium ferrite layer having a selected barium oxide content is first deposited on a substrate material. Subsequent to depositing the first barium ferrite layer, a barium ferrite top layer having a relatively greater barium oxide content is deposited such that the first barium ferrite layer is interposed between the substrate and the second barium ferrite layer and is an underlayer for the layered substrate. In a subsequent step, the layered substrate is annealed at a temperature and a time-at-temperature selected so that the top layer becomes crystalline while significantly less nucleation occurs in the underlayer due to its reduced barium oxide content.

Although it is believed that grains nucleated within the top ferrite-containing layer of the thin films of the invention may grow into the ferrite-containing underlayer, nucleation in the underlayer can be largely suppressed. The ferrite-containing underlayer will allow atoms of the substrate material to diffuse into the underlayer at typical ex-situ thin film anneal temperatures. Thus, the underlayer does not prevent the formation of an interdiffused layer containing substrate atoms. With selection of an underlayer of sufficient thickness and with the use of appropriate annealing conditions, however, the diffusion of substrate atoms may be constrained within the underlayer and a diffused layer containing substrate atoms will not form within the ferrite-containing top layer during annealing.

With respect to the barium ferrite thin films of the invention, for example, it would be expected that some barium atom diffusion from the top barium ferrite layer may occur into the underlayer in the region of the two layers' interface, but such a diffused layer would remain barium-deficient relative to regions of the top layer closer to the film surface.

With respect to the barium ferrite thin films of the invention, for example, it is believed that in addition to acting as a diffusion barrier, the underlayer's reduced barium oxide content relative to the barium ferrite top layer relatively suppresses nucleation in the low barium content barium ferrite layer and, therefore, the intrusion of grains nucleated in the underlayer and mismatched in composition, size, orientation, or lattice type with the grains of the high barium content barium ferrite top layer may be suppressed. It is also believed that the relative barium enrichment of the high barium content barium ferrite top layer allows that layer to crystallize at much shorter annealing times than the relatively low barium content barium ferrite underlayer at sufficiently high ex-situ annealing temperatures, such as 800° C. Thus, it is in large part the relative barium oxide deficiency of the underlayer, i.e., relative to the top layer, and the relative greater nucleation rate of the barium ferrite top layer that allows for suppression of grain nucleation within the barium ferrite underlayer.

The inventors believe that the general principle of the invention would improve the magnetic properties of ferrite thin films disposed on any substrate wherein substrate atoms may diffuse into an overlying ferrite layer when subjected to the elevated temperatures of ex-situ annealing. Examples of such substrates include oxidized silicon, carbon, silicon nitride, silicon carbide, sapphire, and other ceramic-type substrates. Other substrate materials that may be used in fabricating the thin films of the invention will be readily apparent to those of skill in the thin film art.

With regard to barium ferrite, for example, the nucleation rate of an amorphous barium ferrite thin film at ex-situ annealing temperatures will generally increase as the barium oxide content of the film increases. Thus, if nucleation rates higher than those of stoichiometric barium ferrite (approximately 13.4 weight percent barium ferrite) are desired in thin film applications, there is an advantage to enriching the as-deposited barium ferrite film in barium oxide over the stoichiometric amount. Conversely, it is believed that nucleation rates less than those inherent in amorphous stoichiometric barium ferrite thin films will result by reducing the barium oxide content of the as-deposited films below the stoichiometric amount. With this principle in mind, the inventors prefer that the high barium content barium ferrite top layer of the barium ferrite thin films of the invention that are part of the invention include at least a stoichiometric amount of barium oxide. More preferably, in order to enhance the crystallization of the films' high barium content barium ferrite layer, the layer may be at least 5 weight percent rich in barium oxide over stoichiometric (approximately 18 weight percent or more). In order to better suppress nucleation in the low barium content barium ferrite underlayer of the invention's barium ferrite thin films, it is preferred that the underlayer have at least 5 weight percent less barium oxide than the high barium content top layer.

Similarly, the ferrite top layer of ferrite thin films of the invention fabricated from other than barium ferrite preferably should have a composition that enhances the layer's nucleation rate over that of a film of the same ferrite material having a stoichiometric composition. The top layer of the ferrite thin films of the invention may, however, have any composition, whether equal to, greater than, or less than stoichiometric, as long as it may be crystallized on annealing and as long as the compositional difference between the top layer and underlayer provides a suitable nucleation rate suppression relative to the top layer in the underlayer at the particular annealing conditions to be used. In the case of the invention's barium ferrite thin films, for example, the barium oxide contents between the barium ferrite top layer and barium ferrite underlayer must provide a suitable nucleation rate suppression in the underlayer.

The underlayer may be deposited on the substrate using any conventional means for depositing ferrite compounds in the fabrication of thin films. Such deposition procedures will be readily apparent to those of ordinary skill in the production of thin films, and include, for example, sputtering, ion beam deposition, and laser ablation.

Once deposited, a thin film's top layer is subjected to an anneal procedure that will crystallize that layer. Any suitable ex-situ anneal procedure may be used. Such procedures will be readily apparent to those of ordinary skill. Examples of known ex-situ anneal procedures include oven annealing, rapid thermal annealing (RTA), and laser annealing. The anneal time and temperature are selected to crystallize the top layer and impart satisfactory crystallographic and magnetic properties to it.

Once aware of the general concepts of the invention, one may ascertain, without significant experimentation, suitable compositions and thicknesses for the ferrite-containing top layer and underlayer that must be deposited on any particular substrate in order to suppress underlayer grain nucleation and inhibit detrimental substrate atom diffusion at any particular combination of ex-situ annealing conditions.

Embodiments of barium ferrite thin films that are a part of the invention were produced as follows.

EXAMPLE #1

Figure 3:
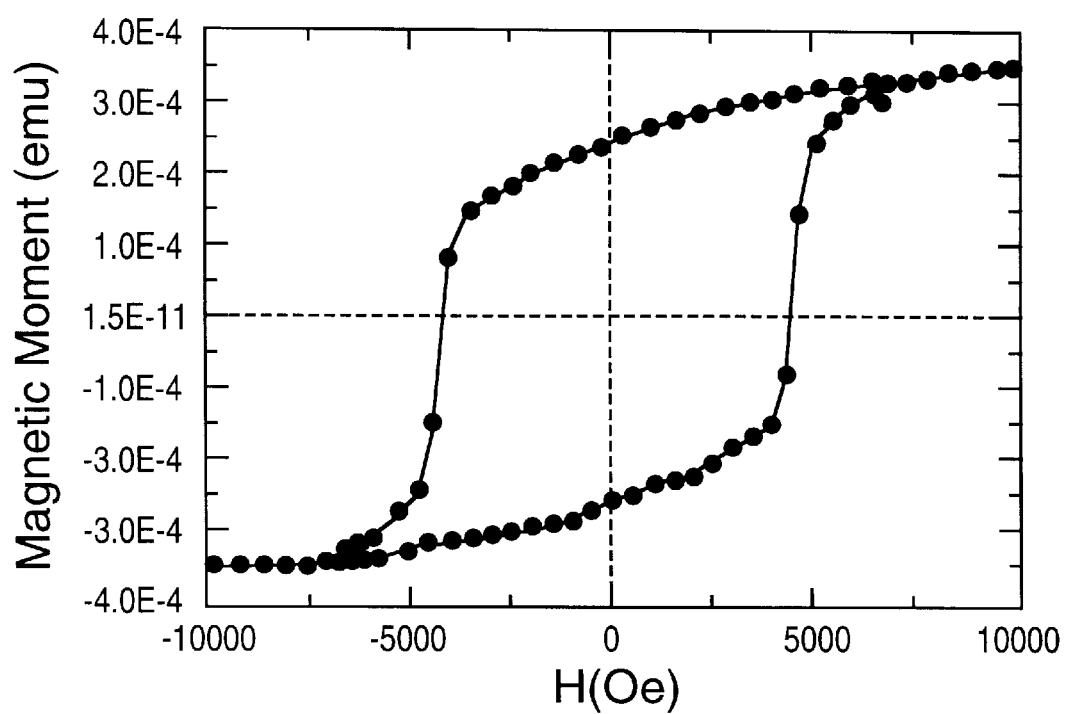
FIG. 3 is a hysteresis loop of a thin film of the invention having a 300 Å thick high barium barium ferrite top layer and a 700 Å thick low barium content barium ferrite underlayer deposited on an oxidized silicon substrate and subjected to a rapid thermal anneal at 790° C. for 60 seconds.

A substrate was prepared by growing a 5000 Å layer of $SiO_2$ on a surface of a sample of pure silicon. A 700 Å layer of barium ferrite was then deposited on the $SiO_2$ by rf sputtering using a Leybold-Z400 sputtering system at room temperature in $Ar/O_2$ gas. The barium ferrite layer was sputtered from a 3-inch barium ferrite target containing about 17 weight percent barium oxide. The resulting barium ferrite layer included about 12 weight percent barium oxide, an amount that is less than the barium oxide content of stoichiometric barium ferrite. A 300 Å barium ferrite layer of relatively greater barium oxide content was deposited on the 700 Å layer by the same technique from a barium ferrite target containing about 28 weight percent barium oxide. The resulting barium ferrite layer contained about 23 weight percent barium oxide, or about 11 weight percent excess barium oxide over a stoichiometric barium ferrite composition. The coated substrate was then heated in a rapid thermal annealing furnace (AG Associates) at 790° C. for 60 seconds at temperature. The annealing conditions were sufficient to substantially fully crystallize the high barium content top layer, but with little nucleation in the low barium content underlayer. Although it was found that grains nucleated within the high barium content top layer grew partially into the low barium content underlayer, nucleation in the underlayer was largely suppressed. The hysteresis loop of the multilayer thin film, depicted in FIG. 3, shows that the thin film medium provides sharp transitions and high coercivity.

EXAMPLE #2

Figure 4:
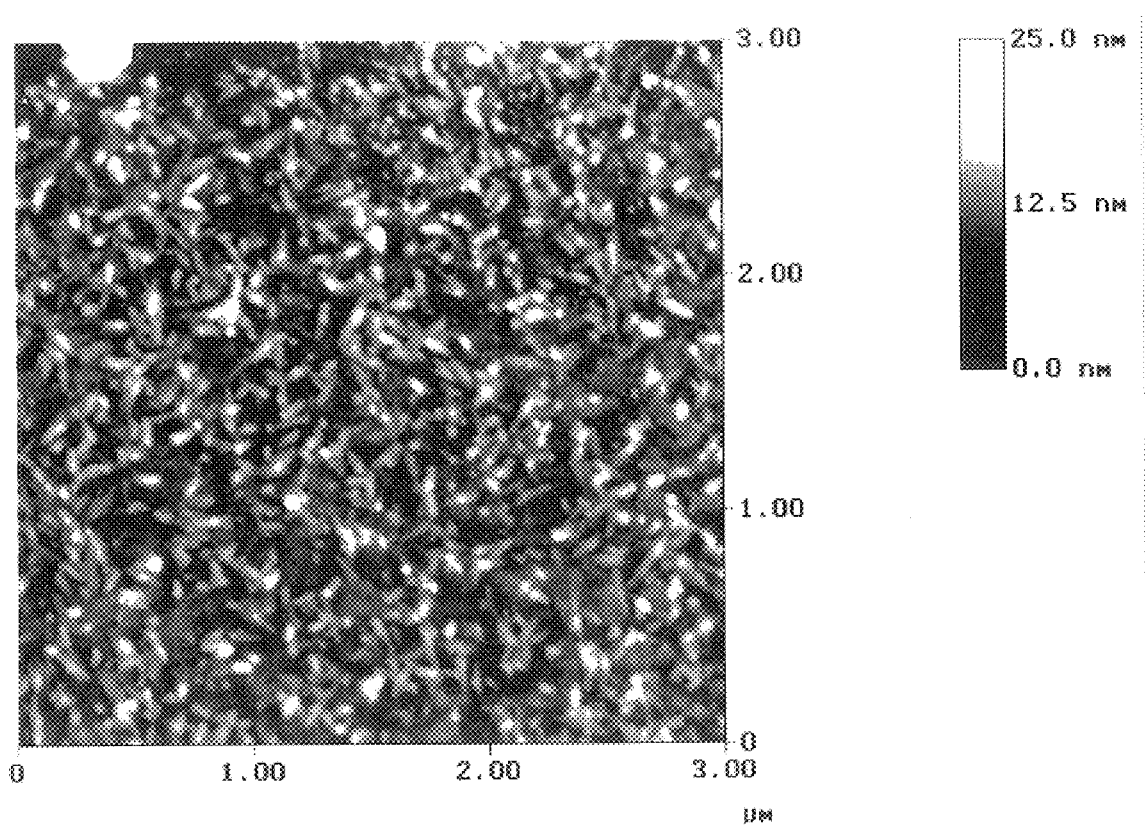
FIG. 4 is an atomic force microscope ("AFM") image of a thin film of the invention having a 200 Å thick high barium content top layer and a 700 Å thick low barium content underlayer deposited on an oxidized silicon substrate and subjected to a rapid thermal anneal at 790° C. for 60 seconds.

A barium ferrite thin film having a 700 Å low barium content underlayer and a 200 Å high barium content top layer was fabricated as described in Example #1. FIG. 4 is an atomic force microscope (Digital Instruments Nanoscope III), or "AFM", image showing the topographic features of the thin film. The AFM image shows a small grain size, which is believed to result in some part from the abundance of nucleation centers in the high barium content top layer.

Figure 5:
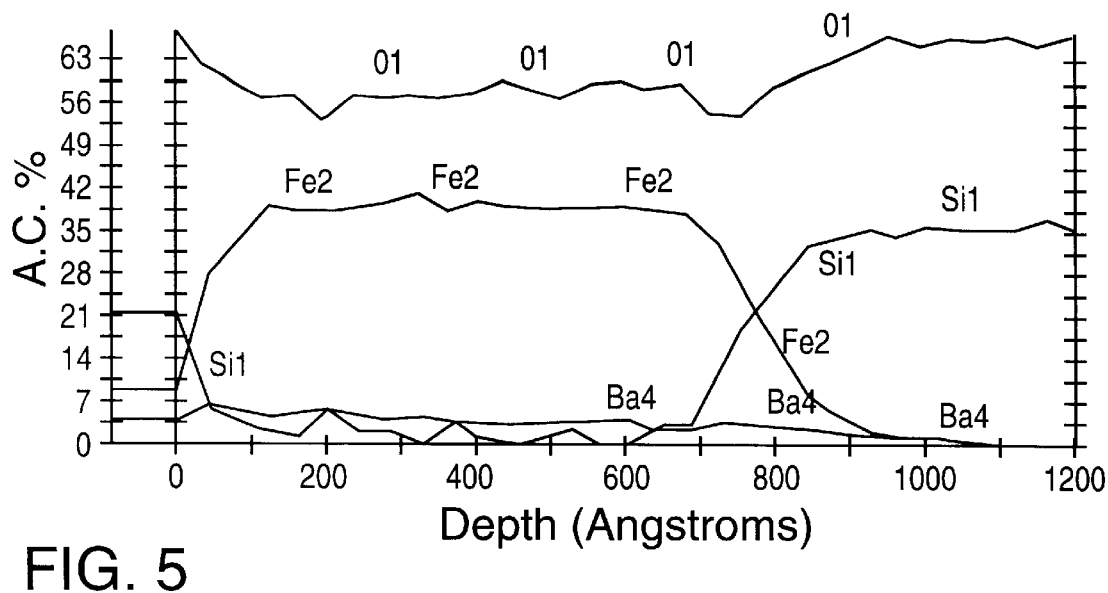
FIG. 5 is an X-ray photoelectron spectroscopy depth profile of a thin film of the invention having a 200 Å high barium content top layer and a 700 Å low barium content underlayer on an oxidized silicon substrate.

An X-ray photoelectron spectroscopy depth profile of the film, shown in FIG. 5, shows the diffusion of silicon atoms into the underlayer to a distance of about 340 Å (the sample surface is indicated by the depth value "0"). Because of surface contamination, the composition in the vicinity of the film surface is distorted. Nonetheless, a gradual decrease of barium content toward the substrate can be seen.

Figure 6:
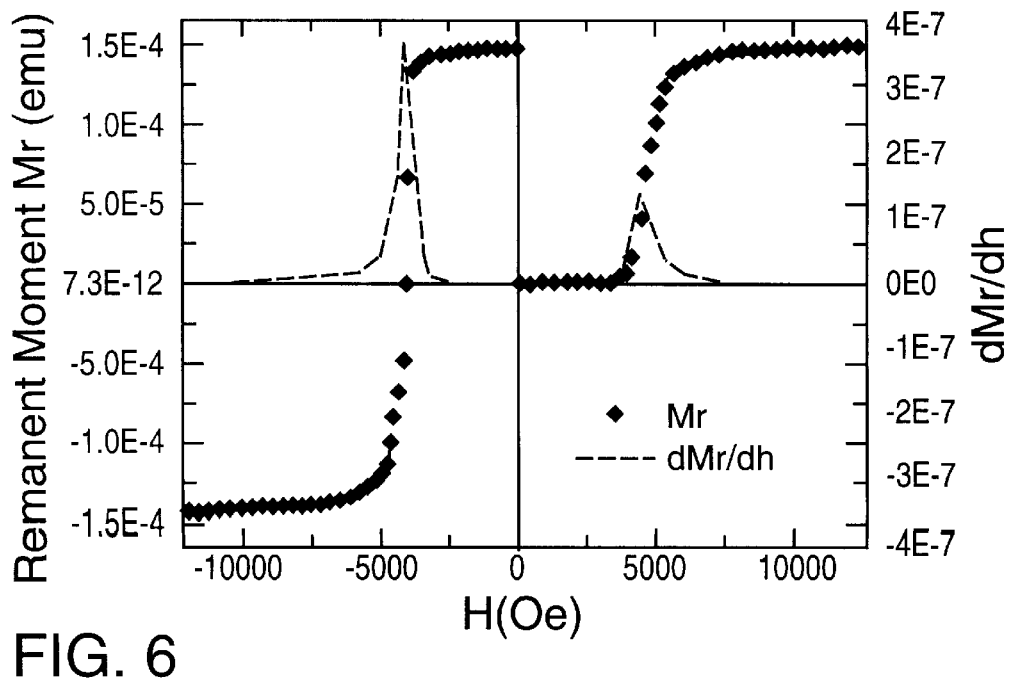
FIG. 6 is a plot of remanent moment ($M_r$) and irreversible susceptibility ($dM_r/dH$) curves of the thin film of the invention having a 200 Å high barium content top layer and a 700 Å low barium content underlayer on an oxidized silicon substrate.

FIG. 6 depicts remanent magnetization curves and plots irreversible susceptibility data $(dM_r/dH)$ for the thin film. The film's narrow switching field distribution can be seen from the figure.

EXAMPLE #3

Figure 7:
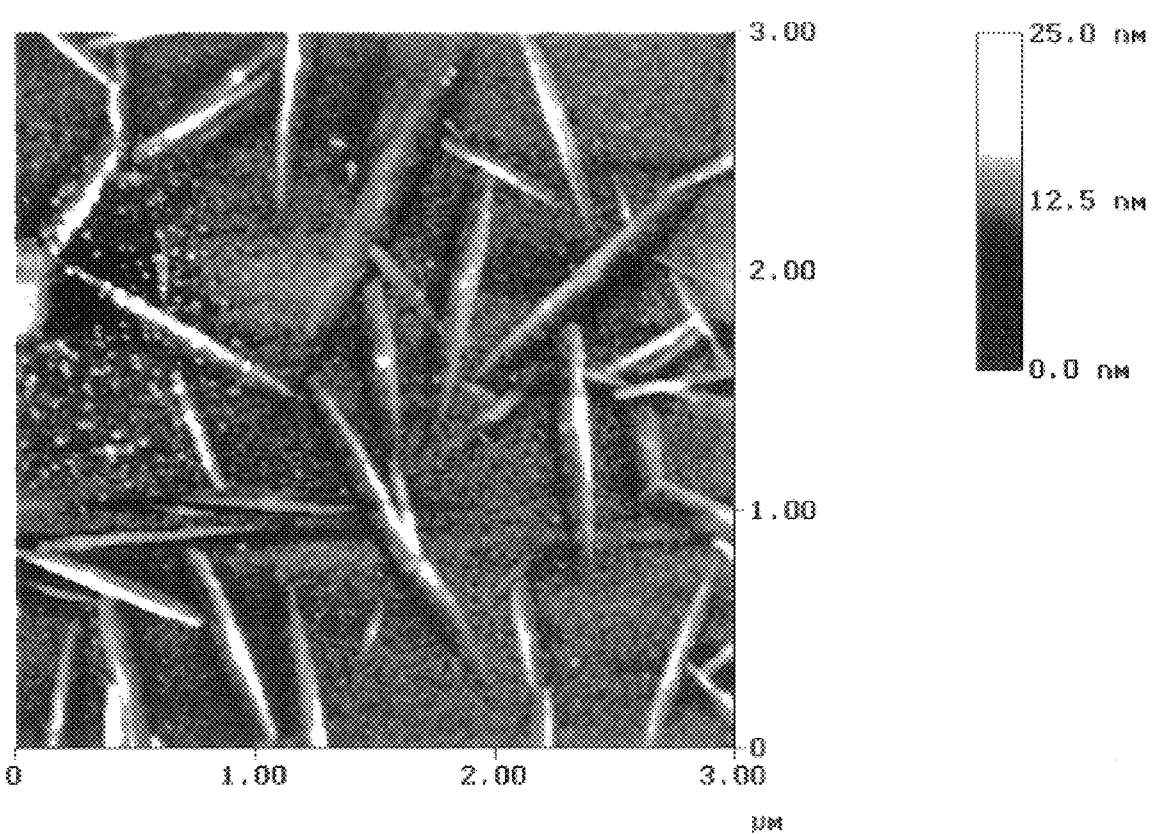
FIG. 7 is an AFM image of a thin film of the invention having a high barium content barium ferrite 50 Å top layer on a 700 Å low barium content barium ferrite underlayer, and annealed at 790° for 60 seconds.
Figure 8:
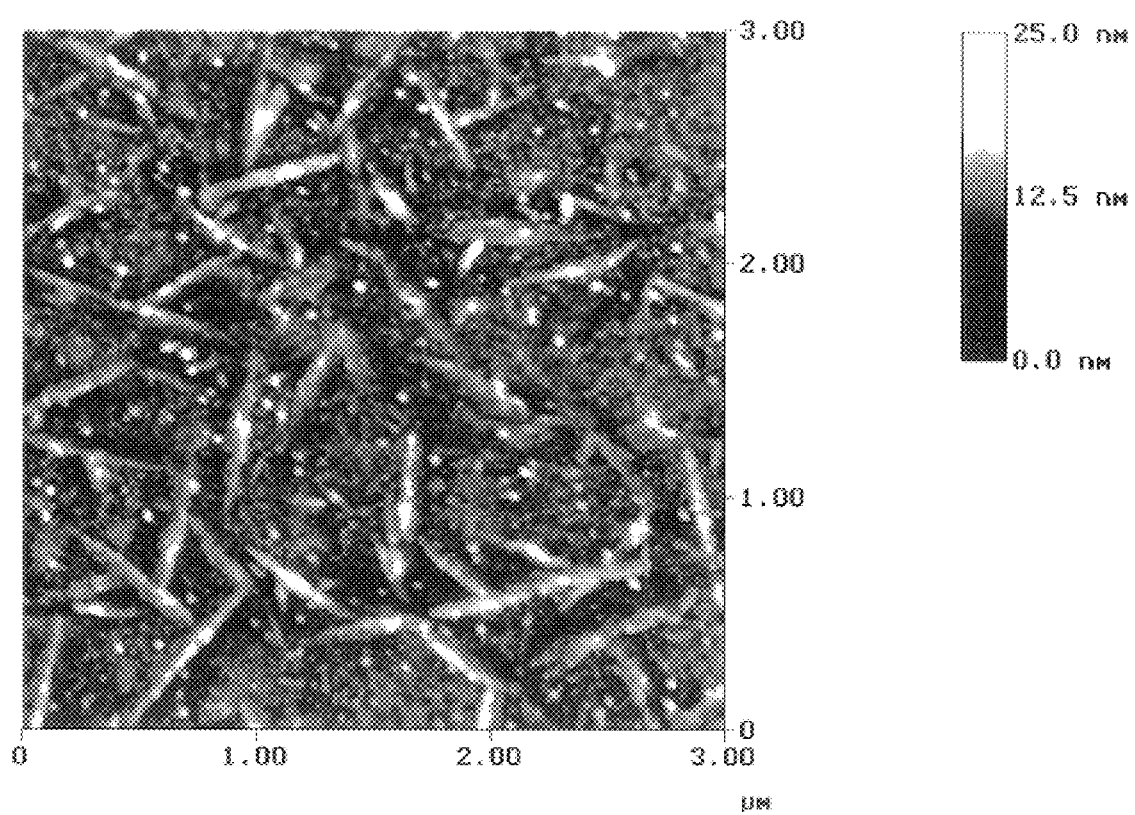
FIG. 8 is an AFM image of a thin film of the invention having a 100 Å high barium content barium ferrite top layer on a 700 Å low barium content barium ferrite underlayer, annealed at 790° C. for 60 seconds.
Figure 9:
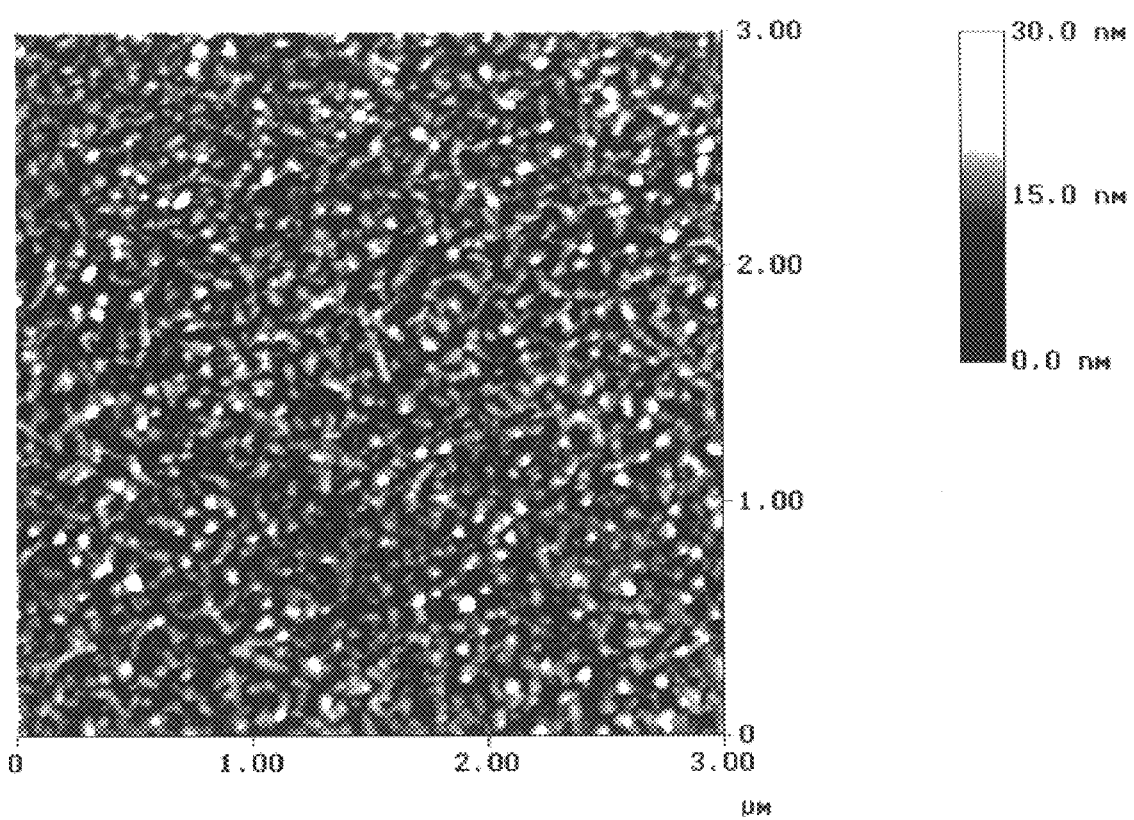
FIG. 9 is an AFM image of a thin film of the invention having a 1400 Å high barium content barium ferrite top layer on a 700 Å low barium content barium ferrite underlayer, annealed at 790° C. for 60 seconds.

Several thin film samples having a 700 Å barium ferrite underlayer containing 12 weight percent barium oxide deposited on an oxidized silicon substrate were fabricated as in Example #1, but with high barium content (23 weight percent BaO) barium ferrite top layers of different thicknesses. Thin film samples with top layer thicknesses measuring approximately 50, 100, 200, and 1400 Å were fabricated in this way. The thin films of Examples #1 and #2 (having 200 and 300 Å high barium content barium ferrite top layers) were also considered. AFM images of the thin films having top layer thickness of 50, 100, and 1400 Å are provided in FIGS. 7, 8, and 9, respectively. The AFM image (FIG. 7) of the thin film having the 50 Å thick top layer exhibited a large grain size, which is believed to be due to the absence of sufficient nucleation centers in the ultra-thin top layer. The AFM image (FIG. 8) of the film having the 100 Å thick top layer shows a smaller grain size, believed due in some part to the presence of a significantly greater number of nucleation sites than in the top layer of the film having the 50 Å top layer. Reference to FIG. 4 demonstrates that an even smaller average grain size results in the 200 Å thick top layer, again believed to result from the abundance of nucleation sites present in the even thicker top film. The image of FIG. 9, directed to the film with the significantly thicker 1400 Å film evidences a still finer grain size.

As comparisons, several thin films were fabricated by depositing 23 weight percent barium oxide barium ferrite layers of varying thicknesses (300, 500, and 1300 Å) directly on oxidized silicon substrates using the deposition and annealing method of Example #1. Comparison thin film samples of varying thickness of barium ferrite (also 23 weight percent barium oxide) deposited on a 2000 Å thick platinum underlayer were also prepared using the procedure of Example #1, but wherein the platinum underlayer was deposited using rf diode sputtering in argon gas.

Figure 10:
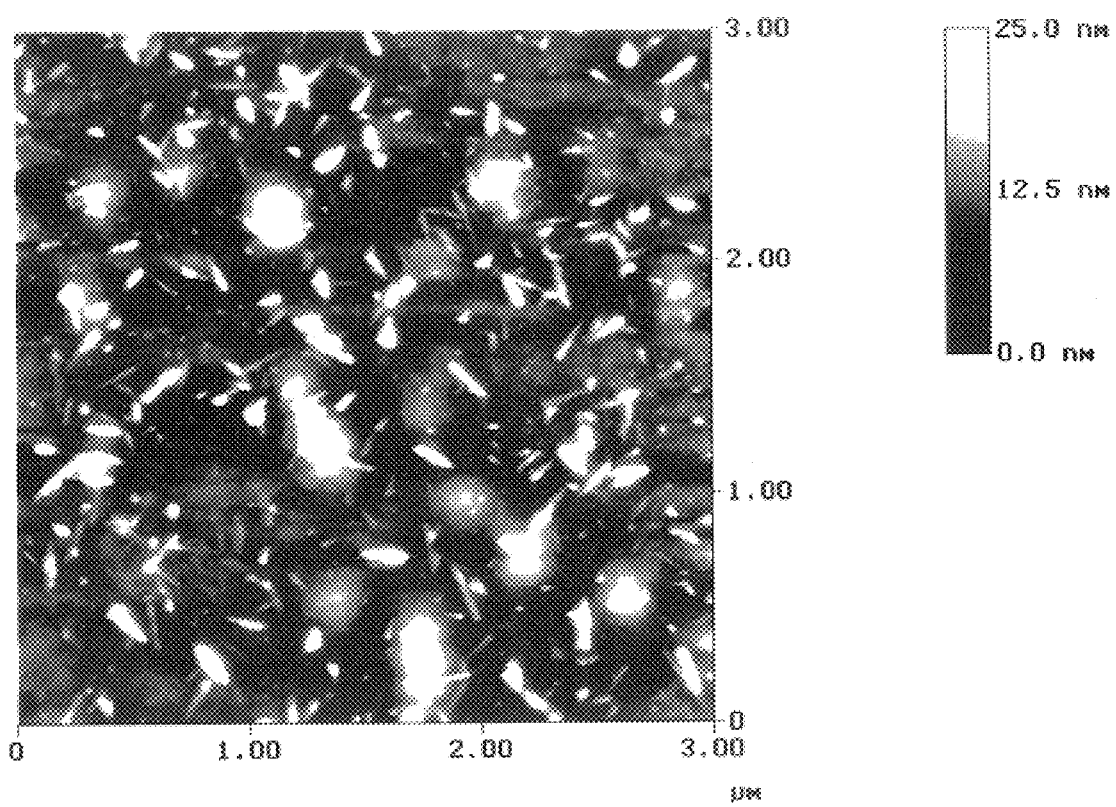
FIG. 10 is an AFM image of thin film of a 300 Å thick barium-rich barium ferrite layer deposited directly on an oxidized silicon substrate, and annealed at 790° C. for 60 seconds.

FIG. 10 is an AFM image of the comparison sample comprising a 300 Å barium ferrite (23 weight percent BaO) layer directly deposited on an oxidized silicon substrate. It is believed that due to silicon diffusion from the substrate into the underlayer during annealing, the nucleation rate in the barium ferrite layer is reduced. Thus, the grains are seen to be sparsely distributed and have a larger grain size than grains nucleated within the thicker films.

Figure 11:
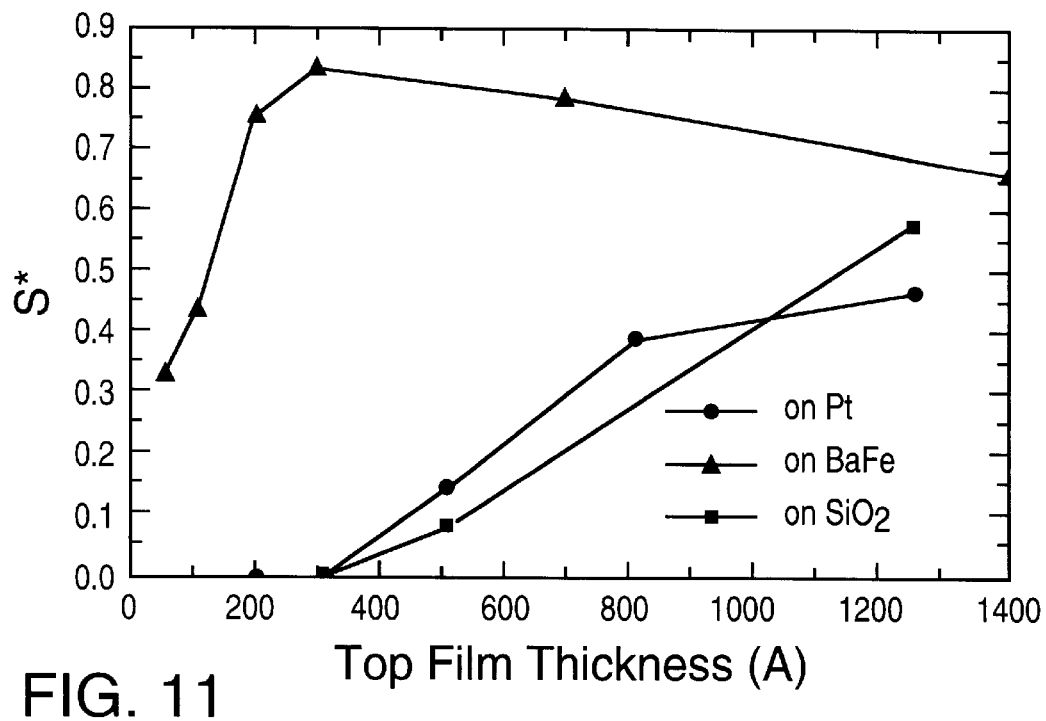
FIG. 11 is a plot of coercivity squareness (S*) as a function of thickness of barium-rich barium ferrite layers deposited (1) on a 700 Å underlayer of low barium content barium ferrite; (2) directly on an oxidized silicon substrate; and (3) on a 2000 Å thick platinum underlayer.

FIG. 11 plots the coercivity squareness (S*) of the various thin films as a function of top film thickness. The dual layer barium ferrite thin films exhibit significantly greater S* than the comparison samples at all thicknesses, and dramatic improvements in S* values are achieved over the comparison films when the low barium content barium ferrite underlayer is used. The highest S* value of 0.83 is obtained when the top layer thickness of the dual layer barium ferrite film shown in FIG. 11 is about 300 Å.

Figure 12:
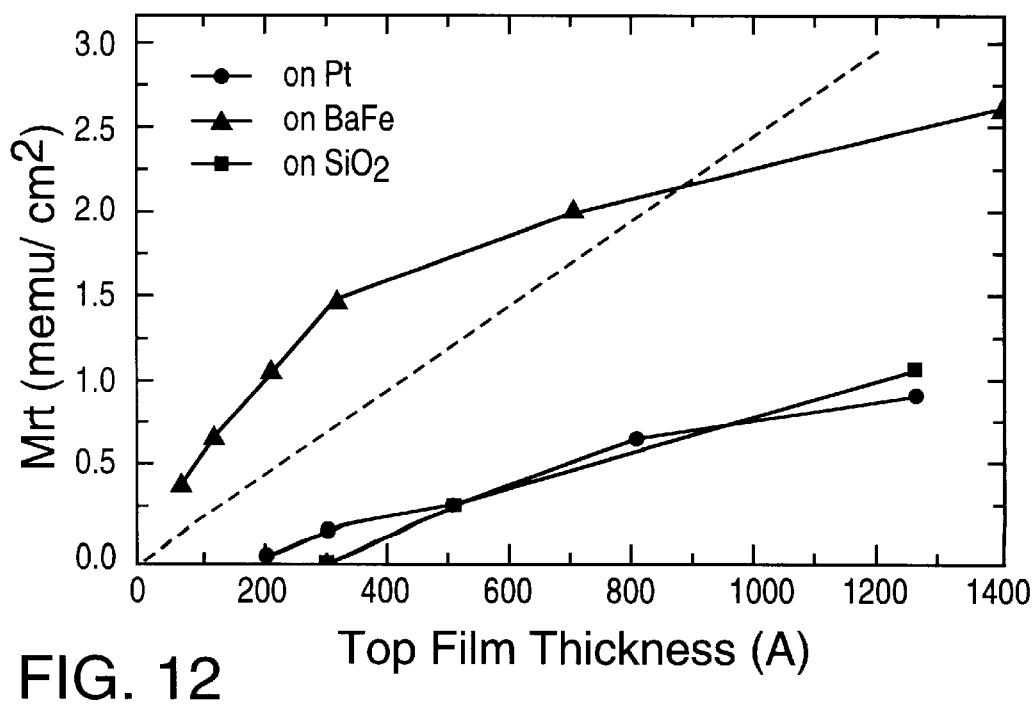
FIG. 12 is a plot of $M_r t$ as a function of top layer thickness for the films whose S* values are shown in 11.

FIG. 12 depicts the thickness dependence of $M_r t$ for the same films whose S* values are shown in FIG. 11. The dashed line is the predicted thickness dependence of $M_r t$ with the following assumptions: (1) without a dead layer; (2) the underlayers are nonmagnetic; and (3) $M_r t$ increases proportionately with the film thickness. As with S* values, the values of $M_r t$ at any given top layer thickness are significantly greater using the low barium content barium ferrite underlayer. The $M_r t$ values obtained for the films indicate that grains nucleated in the top layer partially grow into the low barium content underlayer and contribute to the $M_r t$ values, which are higher than one would expect from the top layer alone.

Figure 13:
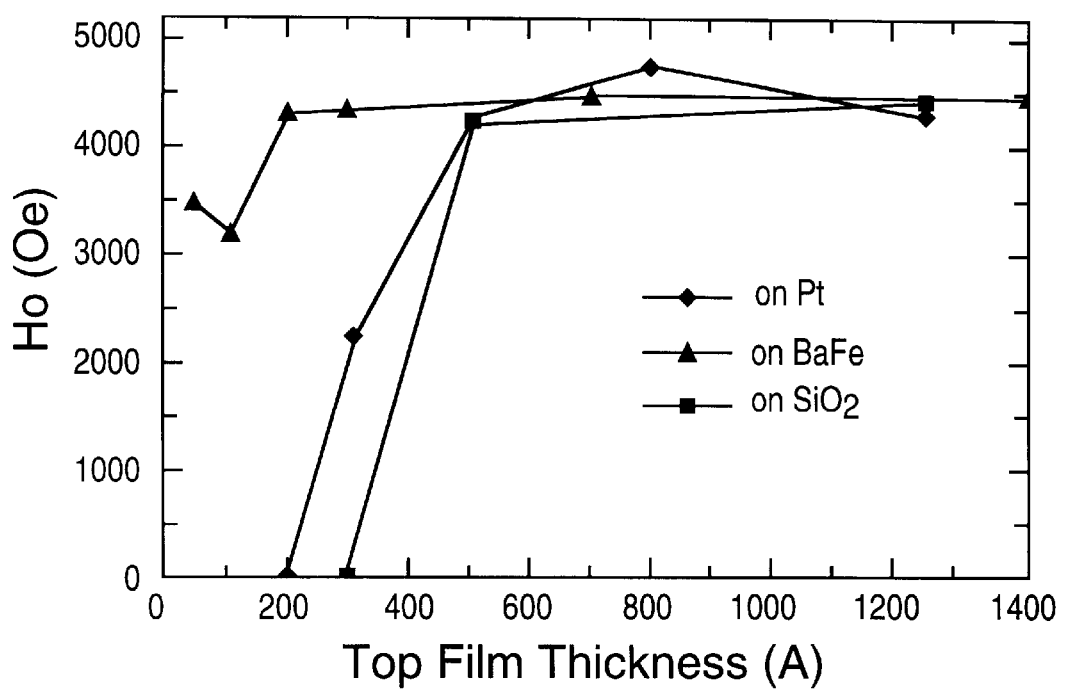
FIG. 13 is a plot of coercivity ($H_c$) as a function of top layer thickness for the films whose S* values are shown in FIG. 11.

The thickness dependence of the coercivity of the films considered in FIGS. 11 and 12 are shown in FIG. 13. The coercivities achieved with the dual layer barium ferrite thin films were high in all instances and appeared to approach the asymptotic value of 4500 Oe when the barium-rich top layer thickness is about 200 Å when the low barium content barium ferrite underlayer is used. At small top layer thickness, less than about 400 Å, the coercivities of the dual layer barium ferrite films of the invention were significantly greater than the comparison films, indicating that the magnetic properties of the top layer of the films are deteriorated much less, or not at all, relative to the comparison samples with substantially the same top film thicknesses. The results of FIGS. 7, 8, and 9 specifically demonstrate that a superior barium ferrite thin film may be fabricated using a relatively low barium content barium ferrite underlayer of about 700 Å and an overlying top layer of relatively barium-rich barium ferrite having a thickness of about 200–300 Å. The top layer of such films exhibit superior magnetic properties for recording purposes. It is believed that the top layer of such films are not significantly affected by any interdiffused dead layer within the underlayers and that grain nucleation within the underlayers is significantly suppressed.

Figure 14:
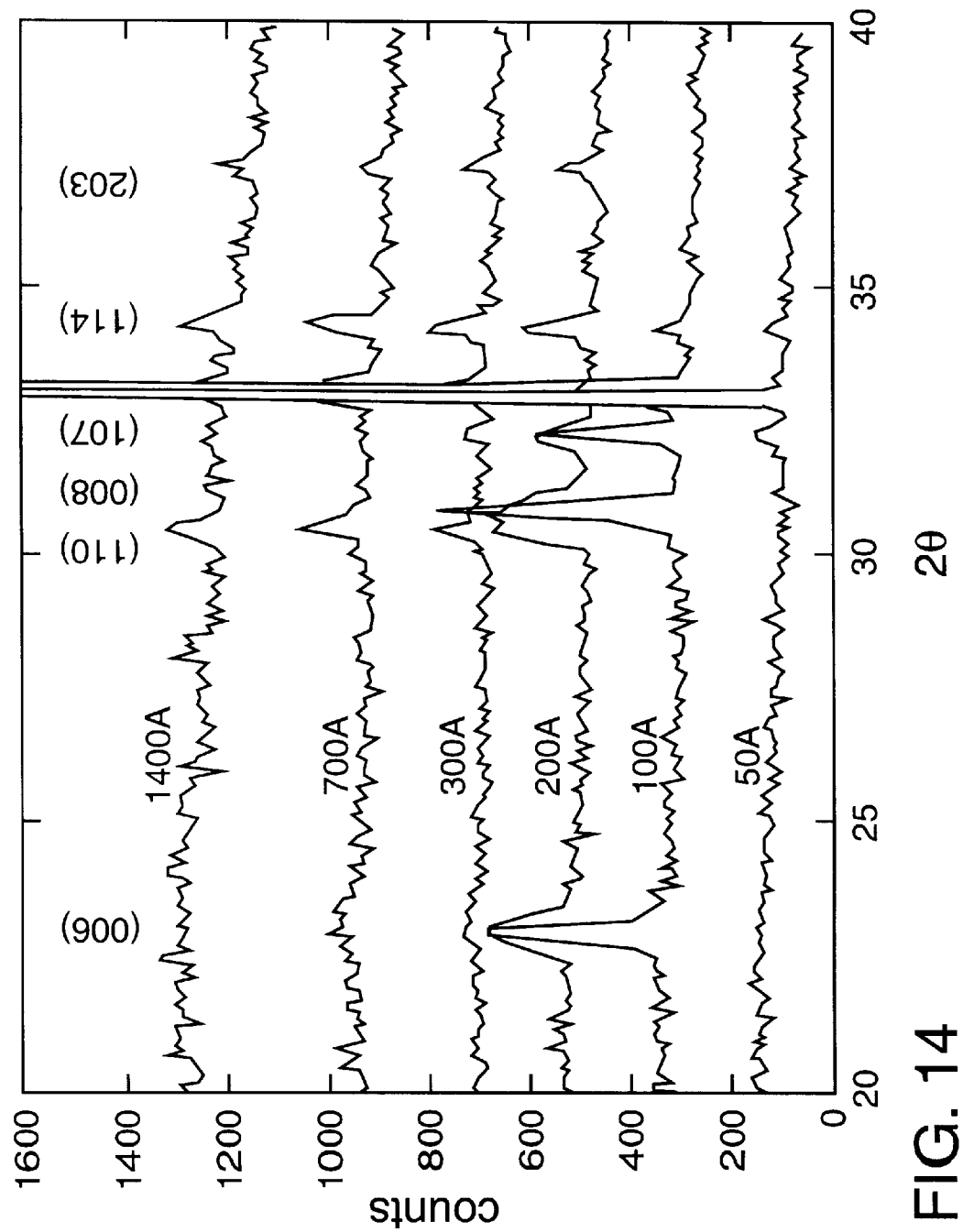
FIG. 14 provides X-ray diffraction patterns of barium ferrite films composed of high barium content top layers of different thicknesses on a 700 Å thick low barium content underlayer.

X-ray diffraction patterns of the dual layer barium ferrite thin films fabricated in this example are shown in FIG. 14. The film having a top layer thickness of 50 Å exhibited weak diffraction peaks, believed to result because a large fraction of the dual layer film remains amorphous after ex-situ annealing. The film having a top layer thickness of 100 Å exhibited predominant (00l) peaks, which indicates that a large fraction of the film's grains may have perpendicularly oriented c-axes, which is undesirable for longitudinal recording applications. With a 200 Å top layer, the (00l) peaks start to decrease and the (110), (114), and (203) peaks begin to increase in intensity, suggesting that most grains have randomly oriented c-axes, the condition desirable for longitudinal recording media. There is no significant increase in peak counts with thicker top layers, even as the top layer thickness is increased to 1400 Å. Films having a small grain size typically exhibit weak and broad X-ray diffraction peaks. Thus, FIG. 14 suggests that the dual layer films having thicker top layers also have smaller grain size in the crystallized top layer on annealing. That relationship is corroborated by the AFM images of FIGS. 4 and 7–9.

EXAMPLE #4

Figure 15:
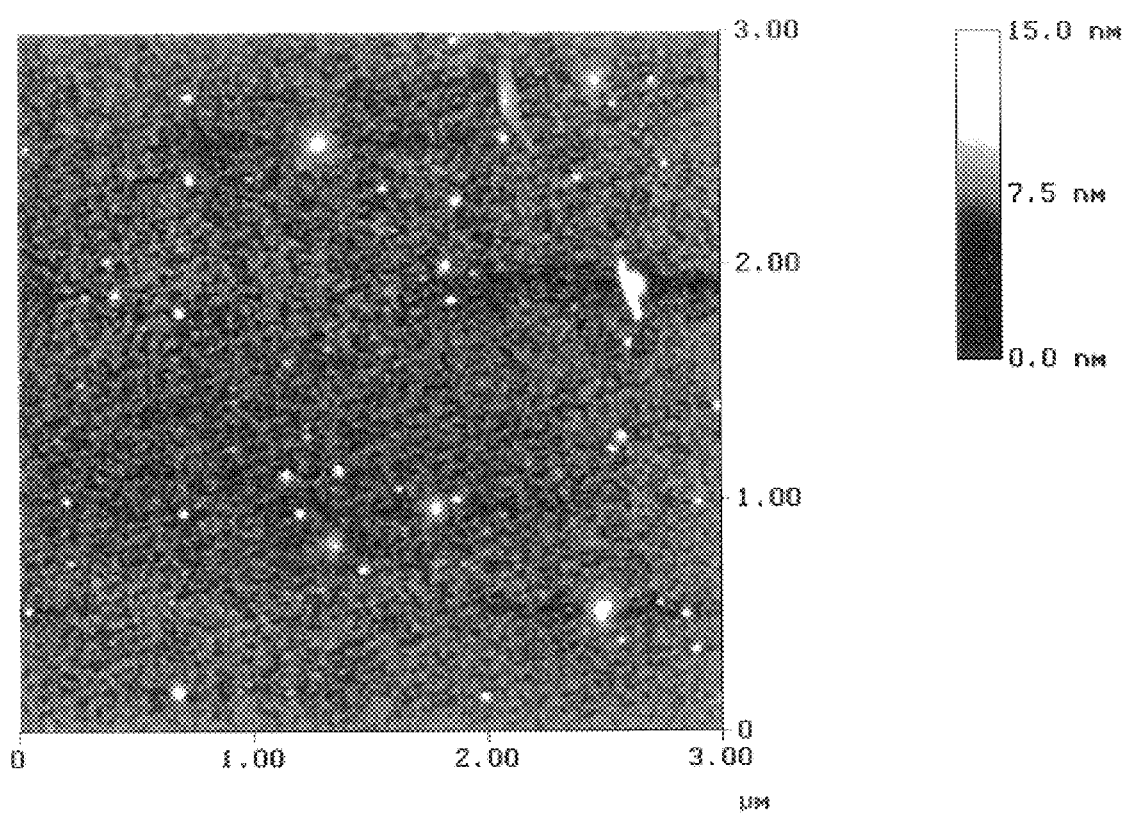
FIG. 15 is an AFM image of a 700 Å thick 12 weight percent barium oxide barium ferrite film on an oxidized silicon substrate, annealed at 790° C. for 60 seconds.

To investigate the occurrence of nucleation in a barium ferrite thin film having less than the stoichiometric barium oxide content, a 700 Å thick barium ferrite film having a composition substantially identical to that of the low barium content barium ferrite underlayers used in Examples #1–#3 (about 12 weight percent BaO) was applied directly on an oxidized silicon substrate. The film was applied by the deposition and annealing procedures discussed above. FIG. 15 is an AFM image of a 3×3 μm portion of the film. The film remains mostly amorphous on annealing with only two grains nucleated in the 3×3 μm area. The observation confirms that a barium ferrite underlayer of like composition and thickness as in Examples #1–#3 deposited on a $SiO_2$ substrate will experience little nucleation in the interdiffused layer adjacent the substrate when annealed under the conditions of Examples #1–#3. On the other hand, the inventor's investigations confirm that a sufficiently barium-rich barium ferrite layer as thin as 50 Å overlying such an underlayer may undergo, in substantial part, an amorphous-to-crystalline transition when subjected to RTA annealing at 790° C. for 60 seconds.

EXAMPLE #5

Samples having a 200 Å thick barium-rich (23 weight percent BaO) barium ferrite top layer and low-barium (12 weight percent BaO) barium ferrite underlayer with differing thicknesses were prepared. The composition of the top layer and underlayer, and the method of depositing the layers on the oxidized silicon substrate are the same as those used in Example #1. In this way, films of the invention having underlayer thicknesses of 200, 400, 600, 700, 800, and 1000 Å were prepared. Samples of films having each top layer thickness were annealed by different methods. One set of samples was subjected to an RTA anneal at 790° C. for 60 seconds. The other set of samples was subjected to an oven anneal at a 600° C. oven temperature for 10 hours before an RTA anneal at 790° C. for 60 seconds.

Figure 16:
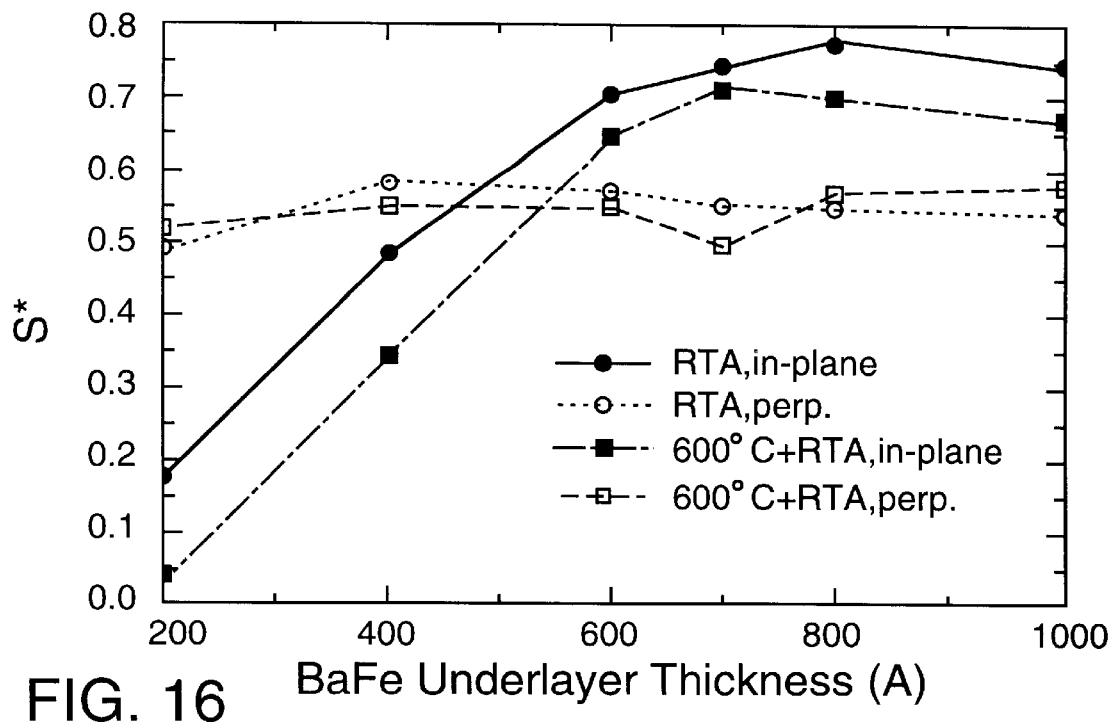
FIG. 16 is a plot of coercivity squareness (S*) versus underlayer thickness for films with a fixed top layer thickness of 200 Å on an oxidized silicon substrate, annealed under various conditions.

FIG. 16 plots the coercivity squareness (S*) values for various films derived from measurements of hysteresis using an alternating gradient magnetometer. Measurements of S* were taken both perpendicular to and in-plane with the film surface to ensure random orientation. The in-plane S* achieved its maximum value of about 0.8 with an 800 Å underlayer thickness and using the one-step annealing procedure. The S* values achieved are greater than for a media fabricated of a single 1200 Å layer of barium ferrite (23 weight percent BaO) on a $SiO_2$ substrate. In-plane S* values were lower at every tested top layer thickness using the two-step anneal. The data confirms that under the tested annealing conditions, a low barium content barium ferrite underlayer having a thickness in the range of 600 to 1000 Å provides an excellent barrier to a 200 Å high barium content barium ferrite top layer from diffusion and unwanted grain intrusion.

Figure 17:
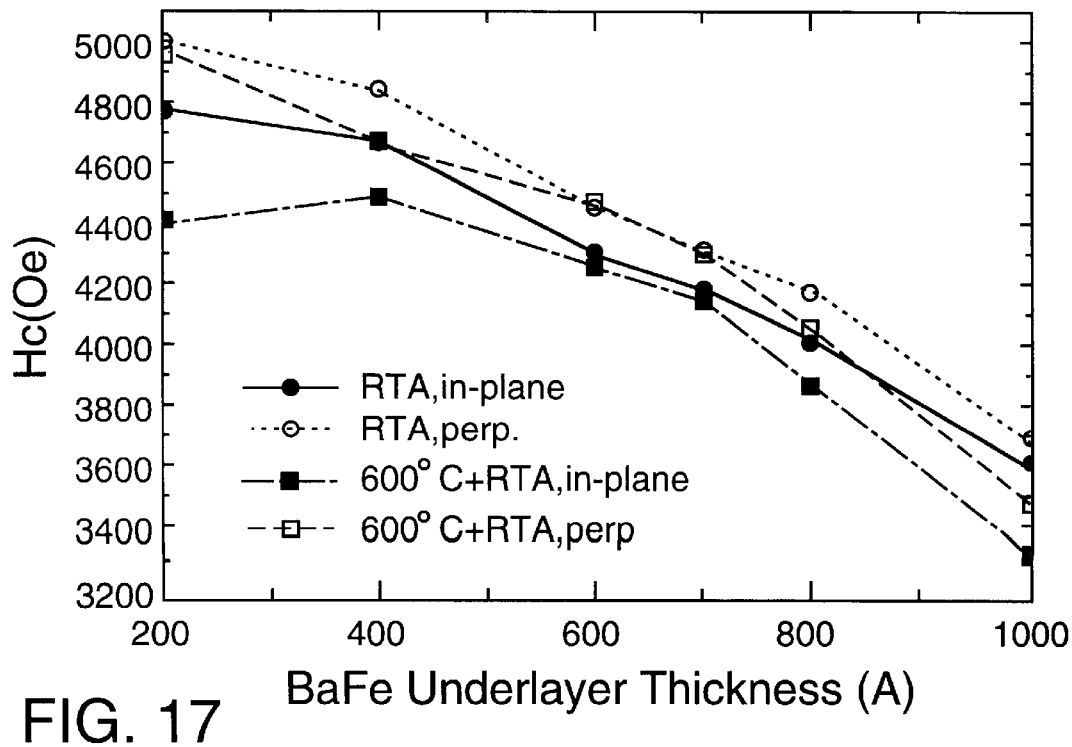
FIG. 17 is a plot of coercivity ($H_c$) versus underlayer thickness for the films of FIG. 16.

The inventors also considered the dependence of coercivity ($H_c$) on underlayer thickness. FIG. 17 provides the measured coercivities for the various films included in FIG. 16. A trend of reduced coercivity with increasing underlayer thickness is apparent regardless of the particular annealing procedure utilized. The decrease in $H_c$ is believed to be caused by the increase in top layer grain size resulting from increases in underlayer thickness. For example, it is believed that in an extreme situation where the underlayer is much thicker than the top layer, the grain size in the high barium content top layer would become substantially equal to the grain size in the low barium content underlayer, and would have a $H_c$ of about 2500 Oe.

Figure 18:
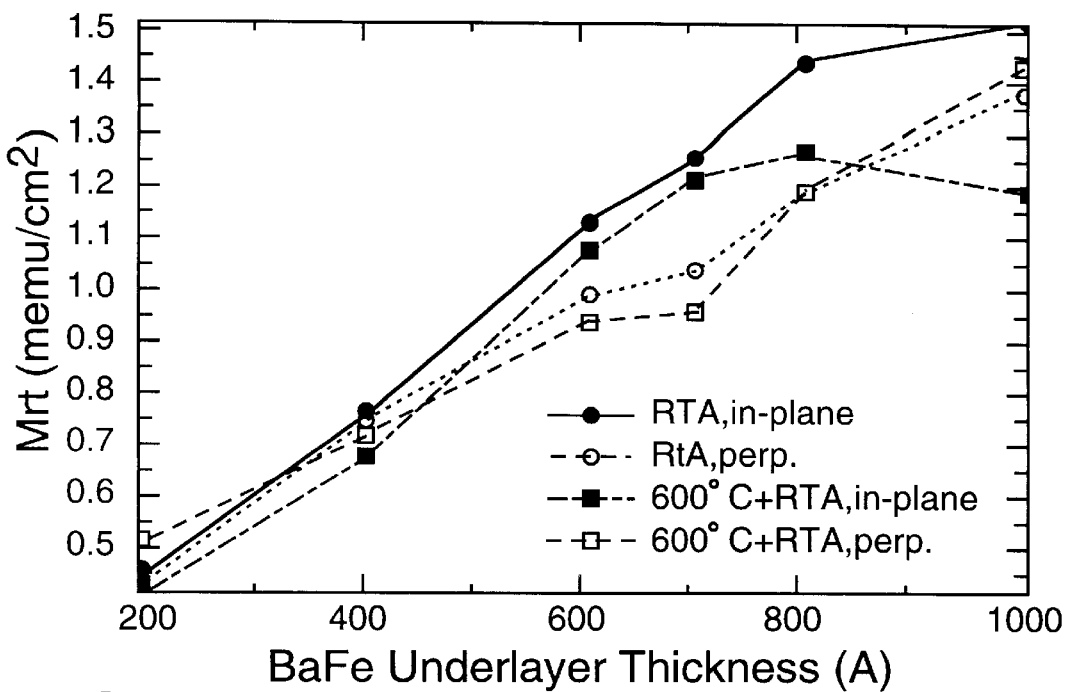
FIG. 18 is a plot of remanent magnetization ($M_r$) and film thickness product ($M_r t$) versus underlayer thickness for the films of FIG. 16.
Figure 19:
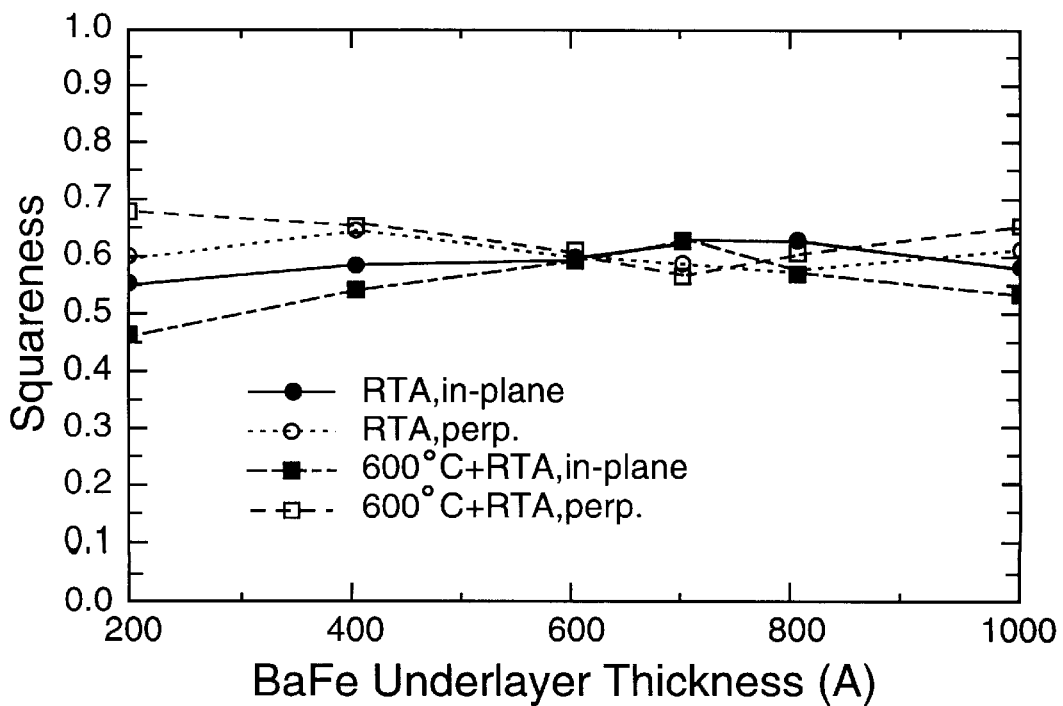
FIG. 19 is a plot of magnetization squareness ($S_q$) versus underlayer thickness for the films of FIG. 16.

FIGS. 18 and 19 provide remanence magnetization and thickness product ($M_r t$) and squareness values, respectively, for the various films considered in FIGS. 16 and 17. The $M_r t$ values are seen to increase with increasing thickness of the underlayer. This relationship indicates that the underlayers are magnetic. This is believed to be a result of grains nucleated in the top layer partially growing into the underlayer. The magnetization squareness ($S_q$) is the ratio of remanence magnetization and saturation magnetization, and the value is an indication of magnetic easy axis orientation. Both the in-plane and perpendicular $S_q$ are close to 0.5–0.6 for every tested sample, indicating a near random c-axis orientation of the top layer grains.

EXAMPLE #6

Barium ferrite thin film samples prepared as in Example #3 (700 Å thick 13 weight percent BaO barium ferrite underlayer on an oxidized silicon substrate, with 23 weight percent BaO barium ferrite top layers of 50, 100, 200, 300, 700, and 1400 Å thicknesses) were studied in both the in-plane and perpendicular directions. Two sets of such samples were annealed, one set by the single-step anneal and another set by the two-step anneal described in Example #5.

Figure 20:
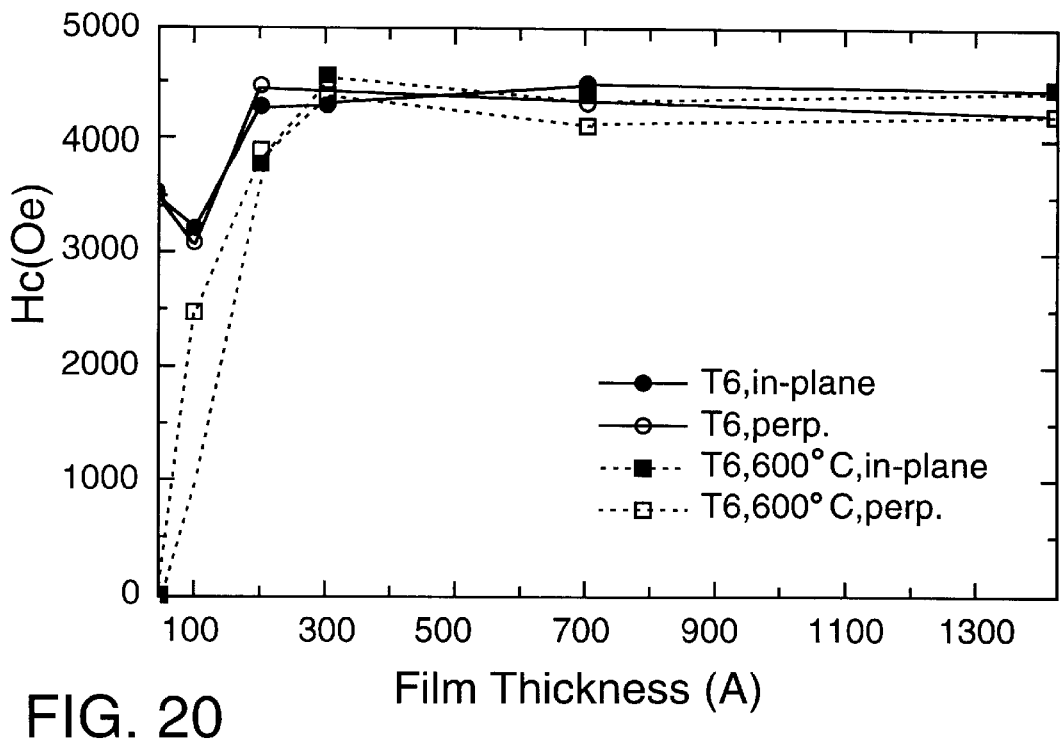
FIG. 20 is a plot of coercivity ($H_c$) versus top layer thickness for thin films of the invention including a low barium content barium ferrite underlayer of 700 Å thickness on an oxidized silicon substrate and varying thicknesses of high barium content barium ferrite top layers, annealed under varying conditions.
Figure 21:
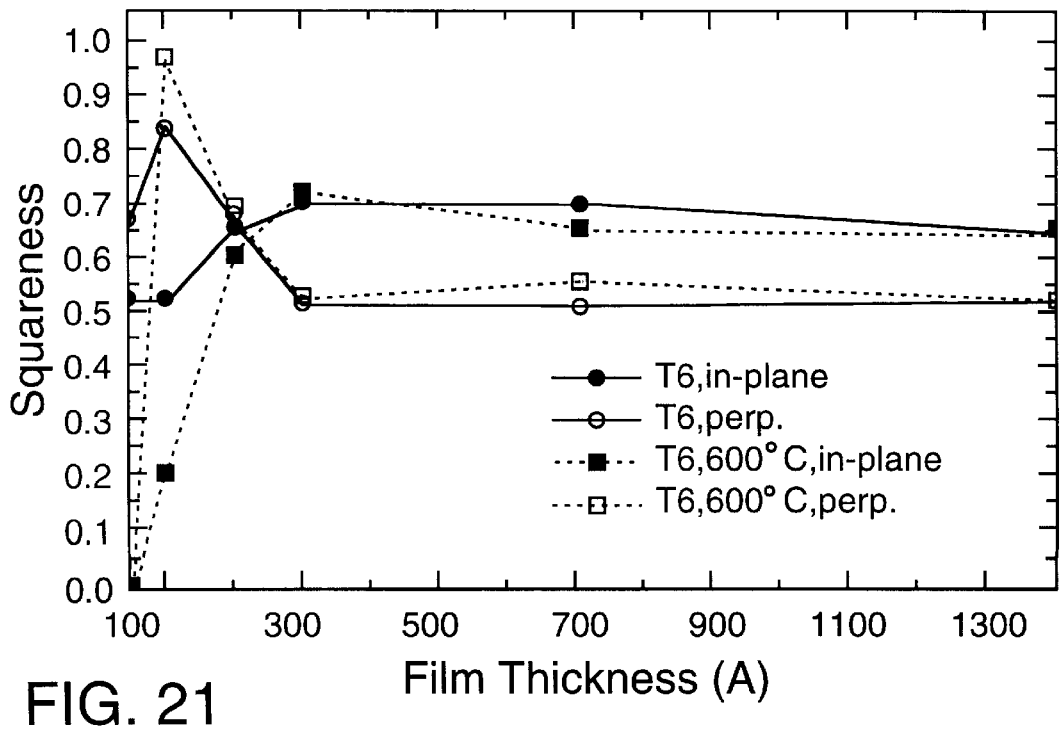
FIG. 21 is a plot of magnetization squareness ($S_q$) versus top layer thickness for the films of FIG. 20.

The coercivity dependence on variations in top layer thickness is provided in FIG. 20. FIG. 21 plots the in-plane and perpendicular $S_q$ of the films. When the top layer thickness is greater than 200 Å, grain size becomes sufficiently small so that $H_c$ reaches the highest value of about 4500 Oe. Similar in-plane and perpendicular properties indicate random c-axis orientation. The sole exception is the film with a 100 Å top layer and annealed with the two step annealing procedure, which showed preferred perpendicular orientation.

It will be understood that various other modifications will be apparent to and can be readily made by those of skill in the art to which the invention pertains without departing from the scope and spirit of the invention. For example, although the thin film media of the invention has been described herein as including a substrate and a ferrite-containing underlayer and top layer, it is contemplated that the invention's ferrite thin films may include one or more additional layers such as, for example, overlayers, lubricant layers, and layers disposed between the substrate and the underlayer. Also, it will be understood that the underlayer and top layer of ferrite thin films of the present invention may include additional elements as taught in the art, including, for example, dopants to modify grain size and coercivity.

Accordingly, it is not intended that the scope of the appended claims be limited to the specific descriptions set forth herein, but rather that the claims be construed to encompass all of the patentable features of the present invention, including all features that would be treated as equivalents thereof by those skilled in the art.

What is claimed:

1. A ferrite thin film comprising:
   a substrate;
   a first layer deposited on at least a surface of said substrate, said first layer comprising a ferrite material and having a first composition;
   a second layer deposited on at least a portion of said first layer, said second layer comprising a ferrite material and having a second composition, said second composition differing from said first composition so that said second layer has a higher nucleation rate than said first layer.

2. The ferrite thin film recited in claim 1 wherein:
   said ferrite material of said first layer comprises atoms of an element M, iron, and oxygen, and has a first content of said element M; and
   said ferrite material of said second layer comprises atoms of an element M, iron, and oxygen, and has a second content of said element M, and said first and second contents differ so that said second layer has a higher nucleation rate than said first layer.

3. The ferrite thin film recited in claim 2 wherein:
   said ferrite material of said first layer comprises barium ferrite having a first barium oxide content; and
   said ferrite material of said second layer comprises barium ferrite having a second barium oxide content that is greater than said first barium oxide content.

4. The ferrite thin film recited in claim 3 wherein said second barium oxide content is at least as great as the barium oxide content of stoichiometric barium ferrite.

5. The ferrite thin film medium recited in claim 4 wherein said second barium oxide content is at least 5 weight percent greater than the barium oxide content of stoichiometric barium ferrite.

6. The ferrite thin film recited in claim 5 wherein said second barium oxide content is at least 10 weight percent greater than the barium oxide content of stoichiometric barium ferrite, and wherein said first barium oxide content is at least 10 weight percent less than said second barium oxide content.

7. The ferrite thin film recited in claim 5 wherein said first layer has a thickness that will prevent diffusion of atoms of said substrate into said second layer during ex-situ annealing of the medium.

8. The ferrite thin film recited in claim 3 wherein said substrate is oxidized silicon and said first layer has a thickness of at least 300 Å.

9. The ferrite thin film recited in claim 8 wherein said first layer has a thickness in the range of 600–800 Å.

10. The ferrite thin film recited in claim 3 wherein said second barium oxide content is at least 23 weight percent and wherein said second layer has a thickness in the range of 100–1000 Å.

11. The ferrite thin film recited in claim 10 wherein said first barium oxide content is at least 10 weight percent less than said second barium oxide content.

12. The ferrite thin film recited in claim 10 wherein substrate comprises oxidized silicon and wherein said first layer has a thickness in the range of 600–800 Å.

13. The ferrite thin film recited in claim 1 wherein said second layer is a crystallized layer.

14. The ferrite thin film recited in claim 13 wherein c-axes of grains of said second layer are randomly oriented.

15. The ferrite thin film recited in claim 14 wherein the medium is a thin film longitudinal magnetic recording medium.

16. The ferrite thin film recited in claim 15 wherein the medium is in the form of a magnetic disk.

17. An information storage device comprising the thin film medium of claim 1, said thin film medium being used for storing information in the form of magnetic bits.

18. The information storage device of claim 17 wherein the device is a magnetic disk drive.

19. In a thin film ferrite comprising a substrate and a first layer comprising a ferrite material having a first composition, the improvement comprising an underlayer, the underlayer comprising a ferrite material having a second composition for improving the properties of the first layer, the underlayer disposed between the substrate and the first layer, said second composition differing from the first composition so that said underlayer has a lower grain nucleation rate than the first layer.

20. In a thin film ferrite comprising a substrate and a first layer comprising a ferrite material having a first composition, the improvement comprising an underlayer, the underlayer comprising a ferrite material having a second composition for improving the properties of the first layer, the underlayer disposed between the substrate and the first layer, said second composition differing from the first composition so that said underlayer has a lower grain nucleation rate than the first layer.

21. The underlayer recited in claim 20 wherein said second barium oxide content is less than the barium oxide content of stoichiometric barium ferrite.

22. The underlayer recited in claim 21 wherein said second barium oxide content is at least 5 weight percent less than said first barium oxide content.

23. The underlayer recited in claim 22 having a thickness that will prevent atoms of the substrate from diffusing into the first layer during ex-situ annealing of the medium.

24. A process for fabricating a magnetic ferrite thin film, the process comprising the following acts:

providing a substrate;

depositing on at least a portion of said substrate a first layer comprising a predominantly amorphous ferrite material having a first composition;

depositing on at least a portion of said first layer a second layer comprising a predominantly amorphous ferrite material having a second composition, said first and second compositions differing so that said first layer has a lower grain nucleation rate than said second layer; and heating said coated substrate at a temperature and for a time so as to crystallize said second layer.

25. The process recited in claim 24 wherein:

said ferrite material of said first layer is barium ferrite having a first barium oxide content;

said ferrite material of said second layer is barium ferrite having a second barium oxide content, said second barium oxide content being greater than said first barium oxide content.

26. The process recited in claim 25 wherein the difference between said first and second barium oxide contents is selected so that the difference in grain nucleation rates between said first and second layers results in nucleation of fewer grains within said first layer than said second layer during said act of heating.

27. The process recited in claim 26 wherein said second barium oxide content is at least as great as the barium oxide content of stoichiometric barium ferrite.

28. The process recited in claim 27 wherein said second barium oxide content is at least 5 weight percent greater than the barium oxide content of stoichiometric barium ferrite.

29. The process recited in claim 28 wherein said second barium oxide content is at least 10 weight percent greater than the barium oxide content of stoichiometric barium ferrite, and wherein said first barium oxide content is at least 10 weight percent less than said second barium oxide content.

30. The process recited in claim 29 wherein said first layer has a thickness that will prevent diffusion of atoms of said substrate into said second layer during said act of heating.

31. The process recited in claim 30 wherein said substrate is oxidized silicon and said first layer has a thickness of at least 300 Å.

32. The process recited in claim 31 wherein said first layer has a thickness in the range of 600–800 Å.

33. The process recited in claim 28 wherein said second barium oxide content is at least 23 weight percent and wherein said top layer has a thickness in the range of 100–1000 Å.

34. The ferrite thin film recited in claim 1 wherein said first layer is an amorphous layer.

35. The underlayer recited in of claim 20 wherein said underlayer is an amorphous layer.

36. A ferrite thin film comprising:

a substrate;

a predominantly amorphous first layer disposed on at least a surface of said substrate, said first layer comprising a first material having the chemical composition of a ferrite material; and a predominantly crystalline second layer disposed on at least a portion of said first layer, said second layer comprising a second material, said second material being a ferrite material, said first material and said second material differing in chemical composition so that said second layer has a higher nucleation rate than said first layer.

37. The ferrite thin film recited in claim 36 wherein:

said first layer comprises atoms of an element M, iron, and oxygen, and has first content of said element M; and said second layer comprises atoms of an element M, iron, and oxygen, and has a second content of said element M, and said first and second contents differ so that said second layer has a higher nucleation rate than said first layer.

38. The ferrite thin film recited in claim 37 wherein:

said first material has the chemical composition of a barium ferrite having a first barium oxide content; and said second material is a barium ferrite having a second barium oxide content that is greater than said first barium oxide content.

39. A thin film ferrite produced by a process comprising the following acts:

providing a substrate;

depositing on at least a portion of said substrate a first layer comprising a predominantly amorphous ferrite material having a first composition;

depositing on at least a portion of said first layer a second layer comprising a predominantly amorphous ferrite material having a second composition, said first and second compositions differing so that said first layer has a lower grain nucleation rate than said second layer; and heating said coated substrate at a temperature and for a time so as to crystallize said second layer.

40. The process recited in claim 39 wherein:

said ferrite material of said first layer is barium ferrite having a first barium oxide content;

said ferrite material of said second layer is barium ferrite having a second barium oxide content, said second barium oxide content being greater than said first barium oxide content.

* * * * *

UNITED STATES PATENT AND TRADEMARK OFFICE
CERTIFICATE OF CORRECTION

PATENT NO. : 6,037,052
DATED : Mar. 14, 2000
INVENTOR(S) : Chen et al.

It is certified that error appears in the above-indentified patent and that said Letters Patent is hereby corrected as shown below:

On the Title page under "Related U.S. Application Data", please delete:

"[63] Continuation-in-part of application No. 08/704,315, Sep. 6, 1996.

[60] Provisional application No. 60/030,236, Nov. 8, 1996."

Signed and Sealed this

Tenth Day of April, 2001

*Attest:*

NICHOLAS P. GODICI

*Attesting Officer*   Acting Director of the United States Patent and Trademark Office